United States Patent
Kim et al.

(10) Patent No.: US 10,164,253 B2
(45) Date of Patent: Dec. 25, 2018

(54) CONDUCTIVE SINGLE CRYSTAL SILICON PARTICLES COATED WITH HIGHLY CONDUCTIVE CARBON CONTAINING NANOPORES AND ULTRATHIN METAL FILM, HIGH CAPACITY LITHIUM ANODE MATERIAL INCLUDING THE SAME, AND PREPARING METHOD THEREOF

(71) Applicant: KOREA ADVANCED INSTITUTE OF SCIENCE AND TECHNOLOGY, Daejeon (KR)

(72) Inventors: Il-Doo Kim, Daejeon (KR); Chan Hoon Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 319 days.

(21) Appl. No.: 15/117,441

(22) PCT Filed: Dec. 15, 2015

(86) PCT No.: PCT/KR2015/013706
§ 371 (c)(1),
(2) Date: Aug. 8, 2016

(87) PCT Pub. No.: WO2017/007091
PCT Pub. Date: Jan. 12, 2017

(65) Prior Publication Data
US 2017/0162868 A1    Jun. 8, 2017

(30) Foreign Application Priority Data
Jul. 7, 2015 (KR) .................. 10-2015-0096681

(51) Int. Cl.
*H01M 4/13* (2010.01)
*H01M 4/36* (2006.01)
(Continued)

(52) U.S. Cl.
CPC ............ *H01M 4/366* (2013.01); *C01B 32/05* (2017.08); *C01B 33/02* (2013.01);
(Continued)

(58) Field of Classification Search
CPC .... H01M 4/366; H01M 4/134; H01M 4/1395; H01M 4/38; H01M 4/587; H01M 4/386;
(Continued)

(56) References Cited

FOREIGN PATENT DOCUMENTS

| JP | 2010059536 A | 3/2010 |
|---|---|---|
| KR | 10-0404290 B1 | 12/2003 |

(Continued)

OTHER PUBLICATIONS

Park, Okji et al., "High-Performance Si Anodes with a Highly Conductive and Thermally Stable Titanium Silicide Coating Layer", RSC Advances, 2013, vol. 3, No. 8, pp. 2538-2542.
(Continued)

*Primary Examiner* — Jane J Rhee
(74) *Attorney, Agent, or Firm* — Fenwick & West LLP

(57) ABSTRACT

Provided are conductive single crystal silicon particles coated with highly conductive carbon containing nanopores and an ultrathin metal film, a high capacity anode material including the same, and a preparing method thereof. The anode material includes conductive single crystal silicon particles each on which at least one element selected from group-III and group-V elements is doped; a thin metal layer formed to coat the surface of each of the conductive single crystal silicon particles; and a highly conductive carbon coating layer formed on the thin metal layer, wherein nanopores are formed between the conductive single crystal silicon particle and the carbon coating layer.

24 Claims, 12 Drawing Sheets

(51) Int. Cl.
| | |
|---|---|
| *H01M 4/134* | (2010.01) |
| *H01M 4/1395* | (2010.01) |
| *H01M 4/38* | (2006.01) |
| *H01M 4/587* | (2010.01) |
| *H01M 4/62* | (2006.01) |
| *C01B 33/02* | (2006.01) |
| *H01M 4/04* | (2006.01) |
| *H01M 4/133* | (2010.01) |
| *H01M 4/1393* | (2010.01) |
| *C01B 32/05* | (2017.01) |
| *H01M 4/02* | (2006.01) |

(52) U.S. Cl.
CPC ....... *H01M 4/0404* (2013.01); *H01M 4/0409* (2013.01); *H01M 4/133* (2013.01); *H01M 4/134* (2013.01); *H01M 4/1393* (2013.01); *H01M 4/1395* (2013.01); *H01M 4/38* (2013.01); *H01M 4/386* (2013.01); *H01M 4/587* (2013.01); *H01M 4/625* (2013.01); *H01M 4/622* (2013.01); *H01M 2004/027* (2013.01)

(58) Field of Classification Search
CPC .. H01M 4/625; H01M 4/0404; H01M 4/0409; H01M 4/133; H01M 4/1393; H01M 4/622; H01M 2004/027
See application file for complete search history.

(56) References Cited

FOREIGN PATENT DOCUMENTS

| KR | 10-2014-0048761 A | 4/2014 |
| KR | 10-2014-0063804 A | 5/2014 |
| KR | 10-2014-0089643 A | 7/2014 |

OTHER PUBLICATIONS

Tian, H., et al., "Micro-sized nano-porous Si/C anodes for lithium ion batteries," Nano Energy, 2015, pp. 490-499, vol. 11.
Jang, H.D., et al., "Aerosol-Assisted Extraction of Silicon Nanoparticles from Wafer Slicing Waste for Lithium Ion Batteries," Scientific Reports, Mar. 30, 2015, pp. 1-5, vol. 5, No. 9431.
PCT International Search Report and Written Opinion for PCT/KR2015/013706, dated May 4, 2016, 11 Pages.
Office Action for Korean Patent Application No. KR 10-2015-0096681, dated Jul. 28, 2016, 13 Pages.

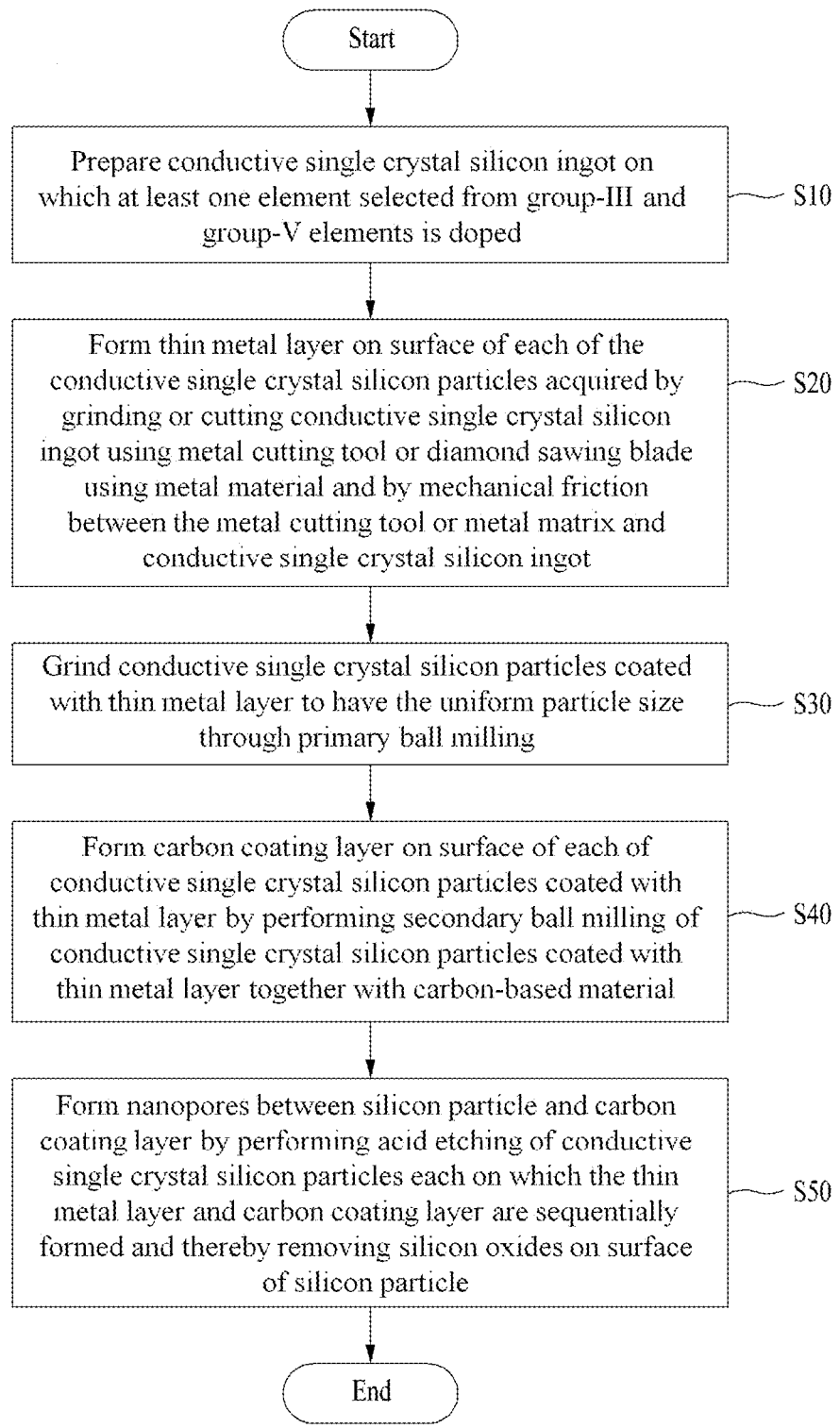

CONDUCTIVE SINGLE CRYSTAL SILICON PARTICLES COATED WITH HIGHLY CONDUCTIVE CARBON CONTAINING NANOPORES AND ULTRATHIN METAL FILM, HIGH CAPACITY LITHIUM ANODE MATERIAL INCLUDING THE SAME, AND PREPARING METHOD THEREOF

BACKGROUND

Field

One or more example embodiments relate to a method of preparing conductive single crystal silicon particles coated with highly conductive carbon containing nanopores and an ultrathin metal film and an anode material for the secondary battery using the same. More specifically, one or more example embodiments relate to conductive single crystal silicon particles coated with highly conductive carbon containing nanopores and an ultrathin metal film, a high capacity anode material for the secondary battery including the same, and a preparing method thereof.

Description of Related Art

A lithium (Li) secondary battery has no memory effect while showing a high energy density, power density, and a low self-discharge rate. In this regard, the lithium the secondary battery has been widely used as an electrical energy storage device of portable electronic devices. In the recent times, with the introduction of electric vehicles, the lithium the secondary battery has been employed for further various purposes. However, the lithium the secondary battery using graphite anode has the low capacity, it may be difficult to design a cell that is provided with a high energy density and lightness at the same time.

Materials which can replace the graphite anode may include silicon, tin, and germanium, which are elements belonging to the same group as carbon constituting graphite. Here, silicon may achieve the high capacity (3580 mA h g$^{-1}$ for $Li_{15}Si_4$ at a room temperature), which approaches about ten times compared to that of the graphite anode. In addition, silicon has a relatively low potential response (<0.4 vs. Li/Li$^+$) against Li. Further, since a large amount of silicon is present on the earth, silicon is significantly advantageous in terms of price compared to other replacements and is nontoxic. However, during the charging, silicon accompanies relatively great volume expansion (>300%, $Li_{3.75}Si$ at room temperature) which leads to the delamination between active material and a collector. As a result, after a few initial cycles, the capacity decreases significantly. In addition, due to a low electrical conductivity ($10^{-5}$ S/cm), a sharp capacity drop occurs in high rate charging and discharging.

Accordingly, to use silicon, which is an ultra-high capacity anode material, researches are generally on 1) mitigating the volume expansion of silicon and 2) enhancing the electrical conductivity of silicon. Initially, to mitigate the volume expansion of silicon, representative ongoing research relates to preventing silicon particles from being crushed even in the case of the volume expansion by grinding bulk silicon particles into nanoparticles and thereby reducing the internal stress of bulk silicon particles in the case of the volume expansion or by introducing a porous structure. Also, research for decreasing the volume expansion by forming a phase ($SiO_2$, $SiC$, $Si_3N_4$, etc.,) not-reacting lithium with silicon particles is ongoing.

In order to enhance the electrical conductivity of silicon, research for coating the surface of silicon with a conductive material has been conducted. Research having achieved the enhanced cycles and high rate charging/discharging results by coating the surface of silicon particles with carbon showing a representatively high electrical conductivity has been published. In addition, there is ongoing research for enhancing the electrical conductivity by coating the surface of silicon particles with a metal, graphene, graphene oxide, and reduced graphene oxide. Such surface coating serves to improve the electrical conductivity and to enhance cycling performances by stabilizing an unstable silicon/electrolyte interface layer and accordingly, has become requirements to use silicon as a high capacity anode material.

Further, a method which can overcome the disadvantages of silicon such as the volume expansion and a relatively low conductivity is required to effectively use the high capacity of silicon. Accordingly, silicon may be covered with a material having a high electrical conductivity and also alleviating the volume expansion of silicon. Representatively, many researches for applying conductive carbon on the surface of silicon have been conducted. However, the existing method forms a carbon coating layer on the surface of silicon by applying a chemical vapor deposition (CVD) or a physical vapor deposition under high temperature using hydrocarbon gas ($CH_4$, $C_2H_4$, $C_7H_8$, etc.) that is explosive and harmful to a body under high temperature or high pressure. The method is dangerous and also requires high-cost facility and process, which makes a mass production difficult.

The most appropriate technology for commercializing a silicon anode is a process method that, without a complex additional process during an existing process of applying a conductive carbon coating layer to silicon particles, may easily and in large quantity produce silicon particles coated with a carbon coating layer which can mitigate the volume expansion of silicon, and containing pore layers which can reduce a stress occurring due to the volume expansion of silicon particles.

SUMMARY

Example embodiments relate to recycling silicon kerf particles generated from a process of preparing a solar cell, and provide conductive single crystal silicon particles having enhanced conductivity through a simple process and each consecutively coated with highly conductive carbon containing nanopores which can mitigate the volume expansion during charging and an ultrathin metal film, a high capacity anode material for the secondary battery, and a preparing method thereof.

According to an aspect, there are provided conductive single crystal silicon particles coated with highly conductive carbon containing nanopores and an ultrathin metal film, and a high capacity anode material for the secondary battery including the same. The anode material includes conductive single crystal silicon particles on which at least one element selected from group-III and group-V elements is doped; a thin metal layer formed on the surface of each of the conductive single crystal silicon particles; and a highly conductive carbon coating layer formed on the thin metal layer. Nanopores are formed between the conductive single crystal silicon particle and the carbon coating layer.

The conductive single crystal silicon particle, the thin metal layer, and the carbon coating layer may have weight ratios of 80 to 99.89 wt %, 0.01 to 1 wt %, and 0.1 to 20 wt %, respectively, and a sum of the weight ratios may be 100 wt %.

The conductive single crystal silicon particles may be acquired from silicon kerf that is byproduct generated during a process of preparing a silicon substrate for solar cell, and may be formed by friction or abrasion between conductive single crystal silicon ingot and a diamond sawing blade for grinding or slicing the conductive single crystal silicon ingot.

The whole quantity of conductive single crystal silicon particles may be acquired from silicon kerf that is byproduct generated during the process of preparing the silicon substrate, which is doped with group-III and group-V elements, for solar cell.

Impurity contained in the conductive single crystal silicon particles may be at least one element selected from B, Al, Ga, and Tl in the case of group III, or at least one element selected from N, P, As, Sb, and Bi in the case of group V, and may be doped within the range of $10^{13}$ to $10^{19}$ atom $cm^{-3}$.

The thin metal layer may be formed on the surface of each of the conductive single crystal silicon particles through a friction or abrasion process of a metal component that constitute a diamond sawing blade and silicon. The thin metal layer may contribute to increasing the surface electrical conductivity of silicon.

The thin metal layer may use at least one of Mo, Ni, Al, Mg, Ti, W, Fe, Cr, and Cu, or at least one of $MoSi$, $Ni_2Si$, $NiSi$, $NiSi_2$, $AlSi_2$, $Mg_2Si$, $TiSi_2$, $WSi_2$, $FeSi_2$, $CrSi_2$, and $CuSi$ that are metal silicide alloyed with silicon.

The thickness of the thin metal layer may be within the range of 0.01 nm to 5 nm.

The conductive single crystal silicon particles coated with the thin metal layer may have a size distribution of 10 nm to 2 μm, which may be selected from the range of 50 nm to 500 nm. When a silicon particle size is less than 50 nm, a tap density of an electrode may decrease after formation of an anode. When the silicon particle size exceeds 500 nm, the stress buffering effect against the volume expansion may decrease.

The carbon coating layer may be formed to coat the silicon surface during a process of mixing or performing ball milling of at least one carbon-based material selected from ketjen black, denka black, acetylene black, super P, fullerene, single-wall carbon nanotube (SWNT), multi-wall carbon nanotube (MWNT), carbon nanofiber, graphene, graphene oxide(graphene oxide), reduced graphene oxide, doped graphene, carbon nanoribbon, natural graphite, and artificial graphite with the conductive single crystal silicon particles, and the silicon particles may have an electrical conductivity of $10^3$ S $cm^{-1}$ or more. The carbon layer formed to coat the surface of each of the conductive single crystal silicon particles including a metal layer may be continuous or may be discontinuous.

The thickness of the carbon coating layer may be within the range of 0.1 nm to 200 nm.

The nanopores formed between the conductive single crystal silicon particle and the carbon coating layer may be formed by removing silica ($SiO_2$) remaining on the surface of silicon particles during an HF etching process after forming the carbon coating layer, and the nanopores may have the volume range of 0.1 vol % to 50 vol % over the volume of the conductive single crystal silicon particles. The nanopores may be formed between the silicon particle on which the metal layer is coated and the carbon layer coated thereon, and may be continuous or discontinuous. Further, the nanopores may be formed by removing silica ($SiO_2$) generally remaining as a thin film on the surface of silicon particles and thus, may form a continuous or discontinuous thin space between silicon and the carbon layer. The nanopores may perform an important role of buffering the volume expansion of silicon.

The carbon coating layer may include a portion that evenly or partially unevenly covers the surface of the conductive single crystal silicon particle.

The conductive single crystal silicon particles each on which the thin metal layer and the carbon coating layer are sequentially formed may have the average diameter selected from the range of 10.1 nm to 2200 nm.

An anode for the secondary battery may be prepared by mixing the conductive single crystal silicon particles each on which the thin metal layer and the carbon coating layer are sequentially formed with a binder and a conductive agent and by forming the mixture on a current collector by slurry casting. Also, the anode for the secondary battery may be prepared by compositing the conductive single crystal silicon particles each on which the thin metal layer and the carbon coating layer are sequentially formed with graphite anode material.

According to another aspect, there is provided an anode for the secondary battery formed by further including a binder and a conductive agent. Here, the conductive single crystal silicon particles each on which the thin metal layer and the carbon coating layer are sequentially formed may be mixed with the binder and the conductive agent and the mixture may be formed on a current collector by slurry casting.

Also, the conductive single crystal silicon particles each on which the thin metal layer and the carbon coating layer are sequentially formed may be mixed with graphite, the binder, and the conductive agent, and the mixture may be formed on a current collector by slurry casting.

According to still another aspect, there is provided a method of preparing an anode material for the secondary battery, the method including preparing conductive single crystal silicon ingot for solar cell on which at least one element selected from group-III and group-V elements is doped; forming a thin metal layer on the surface of each of conductive single crystal silicon particles through mechanical friction or abrasion between conductive single crystal silicon ingot and a metal cutting tool or a metal matrix by grinding or cutting the conductive single crystal silicon ingot using the metal cutting tool or a diamond sawing blade including a metal matrix material; forming a carbon coating layer on the surface of each of the conductive single crystal silicon particles coated with the thin metal layer by ball milling the conductive single crystal silicon particles coated with the thin metal layer with a carbon-based material; and forming nanopores between the conductive single crystal silicon particle and the carbon coating layer by removing silicon oxides on the surface of the conductive single crystal silicon particle through acid etching of the conductive single crystal silicon particles each on which the thin metal layer and the carbon coating layer are sequentially formed.

Here, the method of preparing an anode material for the secondary battery may further include grinding the conductive single crystal silicon particles coated with the thin metal layer to have a uniform particle size through ball milling, prior to forming the carbon coating layer on the surface of each of the conductive single crystal silicon particles coated with the thin metal layer. That is, the carbon coating layer may be formed on the surface of each of the conductive single crystal silicon particles coated with the thin metal layer by performing primary ball milling of the conductive single crystal silicon particles coated with the thin metal layer to have the uniform particle size through ball milling and by performing secondary ball milling of the conductive single crystal silicon particles having the uniform particle size and coated with the thin metal layer with the carbon-based material.

In the forming of the carbon coating layer on the surface of each of the conductive single crystal silicon particles coated with the thin metal layer, the conductive single crystal silicon particle, the thin metal layer, and the carbon coating layer may have weight ratios of 80 to 99.89 wt %, 0.01 to 1 wt %, and 0.1 to 20 wt %, respectively, and a sum of the weight ratios may be 100 wt %, and the carbon-based material added in the performing of the secondary ball milling may have a weight ratio of 0.1 to 20 wt % over the conductive single crystal silicon particle coated with the thin metal layer.

Also, after performing acid etching, the method of preparing an anode for the secondary battery may further including preparing the anode for the secondary battery by mixing the conductive single crystal silicon particles each on which the thin metal layer and the carbon coating layer are sequentially formed and containing nanopores with a binder and a conductive agent and by forming the mixture on a current collector by slurry casting. The conductive single crystal silicon particle on which the thin metal layer and the carbon coating layer are sequentially formed and containing nanopores, the conducting agent, and the binder, which are used for preparing the anode, may have weight ratios of 60 to 80 wt %, 5 to 15 wt %, and 5 to 20 wt, respectively. A sum of the weight ratios may be 100 wt %.

Also, the conductive single crystal silicon particles each on which the thin metal layer and the carbon coating layer are sequentially formed and containing nanopores may be mixed with graphite anode material being currently commercialized and thereby be used to the anode. Here, the conductive single crystal silicon particles each on which the thin metal layer and the carbon coating layer are sequentially formed and containing nanopores may be included at the content within the range of 2 to 50 wt % over graphite.

The carbon coating layer containing the nanopores and the thin metal film may perform an important role in forming a stable solid electrolyte interface (SEI) layer on the surface of the anode material and a buffer layer that increases a high rate capability of the secondary battery and suppresses a volume expansion occurring during charging and discharging of silicon by increasing a surface electrical conductivity of the conductive single crystal silicon particles.

The method of preparing an anode for the secondary battery may further include forming the anode for the secondary battery by performing acid etching of the conductive single crystal silicon particles each on which the thin metal layer and the carbon coating layer are sequentially formed and then mixing the conductive single crystal silicon particles each on which the thin metal layer and the carbon coating layer are sequentially formed with a binder and a conductive agent and forming the mixture on a current collector by slurry casting or mixing the conductive single crystal silicon particles each on which the thin metal layer and the carbon coating layer are sequentially formed with graphite, the binder, and the conductive agent and forming the mixture on the current collector by slurry casting.

According to example embodiments, there may be provided conductive single crystal silicon particles having a high electrical conductivity and excellent durability, each on which a thin metal layer and a carbon coating layer are sequentially formed, and containing nanopores.

According to example embodiments, there may be provided an anode material for secondary matter that may have a significantly high electrical conductivity and durability and may also have a high rate capability and a cycling performance which can preventing silicon particles from being destroyed due to the volume expansion during charging by removing silica through acid treatment after mixing and ball milling conductive single crystal silicon particles coated with a thin metal layer and impurity is doped with a carbon-based material and thereby providing silicone particles coated with highly conductive carbon containing nanopores, and an anode for the secondary battery using the anode material.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 2 is a flowchart illustrating a method of preparing a silicon anode material coated with highly conductive carbon containing nanopores and a thin metal layer according to example embodiments.

DETAILED DESCRIPTION

Figure 1A:
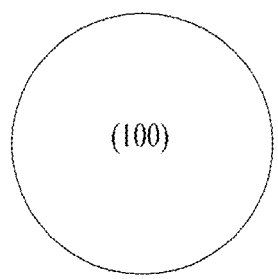
FIGS. 1A, 1B, 1C, and 1D illustrate examples of conductive single crystal silicon particles coated with highly conductive carbon containing nanopores and an ultrathin metal film according to example embodiments.

Reference will now be made in detail to example embodiments of the present disclosure, examples of which are illustrated in the accompanying drawings, wherein like reference numerals refer to like elements throughout. Example embodiments are described below to explain the present disclosure by referring to the figures.

Hereinafter, a method of preparing an anode material for the secondary battery recycling silicon kerf that has an excellent electrical conductivity and a high rate capability since highly conductive carbon containing nanopores and an ultrathin metal film are coated, and also has an excellent cycle performance through mitigation of the volume expansion during charging will be described with reference to the accompanying drawings.

Herein, an impurity element selected from group-III or group-V elements may be at least one element selected from B, Al, Ga, and Tl in the case of group III and at least one element selected from P, As, Sb, and Bi in the case of group V. Without being limited to a specific element, any element which can enhance the electrical conductivity of silicon particles and selected from group-III or group-V elements may be employed.

Herein, a thin metal layer may include at least one element selected from MoSi, $Ni_2Si$, NiSi, $NiSi_2$, $AlSi_2$, $Mg_2Si$, $TiSi_2$, $WSi_2$, $FeSi_2$, $CrSi_2$, and CuSi, or at least one element selected from MoSi, $Ni_2Si$, NiSi, $NiSi_2$, $AlSi_2$, $Mg_2Si$, $TiSi_2$, $WSi_2$, $FeSi_2$, $CrSi_2$, and CuSi that are alloyed with silicon. Various metal silicide phases may be formed based on a raw material of metal as a metal silicide phase formed by friction between a metal material constituting a diamond sawing blade and silicon single crystal. Without being limited to a specific raw material, any metal material which can increase the surface conductivity of silicon particles may be employed.

In the present specification, a thickness of the thin metal layer may be within the range of 0.01 nm to 5 nm.

Herein, conductive single crystal silicon particles acquired by performing primary ball milling of particles acquired from silicon kerf and coated with the thin metal layer may have the average diameter within the size distribution of 10 nm to 2 μm, and more desirably, may have the size distribution of 50 nm to 500 nm.

According to example embodiments, there is provided an anode material for the secondary battery that may overcome the low electrical conductivity, the destruction of silicon particles occurring due to the volume expansion during charging, and the degradation in the performance occurring due to separation from a conductive matrix, which are found in silicon-based anode material, by recycling silicon kerf particles occurring during a process of preparing a silicon substrate for solar cell, and a method of preparing the anode material. According to example embodiments, there are provided conductive single crystal silicon particles having the enhanced conductivity through a simple process and coated with highly conductive carbon containing nanopores which can mitigate the volume expansion during charging and an ultrathin metal film, a high capacity anode material for the secondary battery, and a preparing method thereof.

To this end, there is provided a method of recycling, as silicon anode material for the secondary battery having the high capacity, high rate, and cycling performances at the same time through an additional carbon coating process and nanopore forming process, silicon particles acquired during a process of grinding or cutting conductive single crystal silicon ingot on which at least one element selected from group-III or group-V elements is doped to prepare the same as a wafer of a silicon substrate for solar cell.

In detail, first, an aspect of the present disclosure is to provide conductive single crystal silicon particles coated with highly conductive carbon containing nanopores and an ultrathin metal film by recycling silicon kerf particles occurring during a process of grinding or cutting conductive single crystal silicon ingot on which at least one element selected from group-III or group-V elements is doped to prepare the same as a wafer of a silicon substrate for solar cell and a high capacity anode material for the secondary battery including the same.

Second, an aspect of the present disclosure is to provide conductive single crystal silicon particles coated with highly conductive carbon containing nanopores and having the excellent conductivity of $10^3$ S cm$^{-1}$ or more and an ultrathin metal film by forming a conductive carbon coating layer on the silicon surface through a simple process of mixing and performing ball milling of conductive single crystal silicon particles coated with the thin metal layer with carbon-based material and a high capacity anode material for the secondary battery including the same.

Third, an aspect of the present disclosure is to provide conductive single crystal silicon particles that may significantly enhance the low electrical conductivity, which is generally found in a silicon anode, since conductive single crystal silicon particles coated with a thin metal layer are surrounded by carbon together with nanopores, and coated with highly conductive carbon containing nanopores which can mitigate the volume expansion of silicon due to the nanopores present between carbon and the silicon particle and a carbon matrix, and an ultrathin metal film, and at least one element selected from group-III or group-V elements is doped and high capacity anode material for the secondary battery.

FIGS. 1A, 1B, 1C, and 1D illustrate examples of a conductive single crystal silicon particle coated with highly conductive carbon containing nanopores and an ultrathin metal film according to example embodiments.

Referring to FIG. 1A, a conductive single crystal silicon particle (100) indicates a conductive single crystal silicon particle on which at least one element selected from group-III or group-V elements is doped.

Figure 1B:
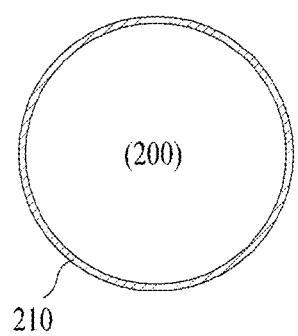

FIG. 1B illustrates a conductive single crystal silicon particle (200) on which a thin metal layer (210) is formed by coating the surface of the conductive single crystal silicon particle (100) with the thin metal layer (210).

Figure 1C:
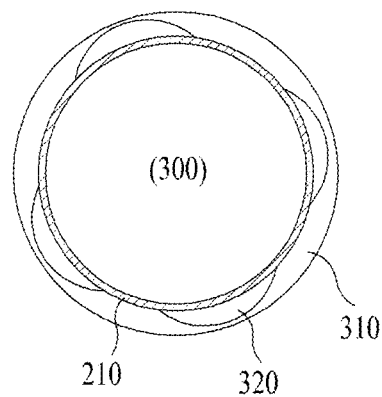

FIG. 1C illustrates a conductive single crystal silicon particle (300) on which the thin metal layer (210) and a carbon coating layer (310) are sequentially formed, and may be formed by coating, with the carbon coating layer (310), the surface of the conductive single crystal silicon particle (200) coated with the thin metal layer (210). That is, the conductive single crystal silicon particle (300) may be formed by sequentially coating the thin metal layer (210) and the carbon coating layer (310) on the surface of the conductive single crystal silicon particle (100), and may indicate a conductive single crystal silicon particle coated with highly conductive carbon, for example, the carbon coating layer (310), containing nanopore (320) and the thin metal layer (210). Here, the thin metal layer (210) and the carbon coating layer (310) may form a continuous carbon coating layer or may form a discontinuous carbon coating layer based on a grinding condition and a ball milling time.

Here, [conductive single crystal silicon on which impurity selected from group-III or group-V elements is doped]X, [metal]Y, and [carbon]Z may have weight ratios of X=80 to 99.89 wt %, Y=0.01 to 1 wt %, and Z=0.1 to 20 wt %, respectively, and X+Y+Z=100 wt %.

Figure 1D:
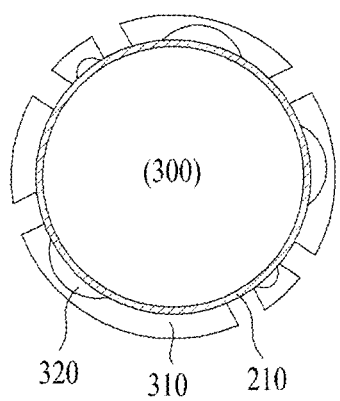

The conductive single crystal silicon particle (100) may have the excellent bulk silicon electrical conductivity since an impurity element is replaced with silicon. The conductive single crystal silicon particle (300) on which the thin metal layer (210) and the carbon coating layer (310) containing the nanopores (320) are sequentially formed may be formed by evenly coating the carbon coating layer (310) on the surface of the conductive single crystal silicon particle (200) coated with the thin metal layer (210) as shown in FIG. 1C, or may be formed by partially coating the carbon coating layer (310) on the surface of the conductive single crystal silicon particle (200) coated with the thin metal layer (210) as shown in FIG. 1D.

The conductive single crystal silicon particle (300) on which the thin metal layer (210) and the carbon coating layer (310) are sequentially formed may have the excellent surface conductivity due to its high electrical conductivity compared to commercial silicon. The conductive single crystal silicon particle (300) on which the thin metal layer (210) and the carbon coating layer (310) are sequentially formed may provide a marginal space within the carbon coating layer (310) according to the volume expansion of silicon particles during charging and thus, may prevent the silicon particles from being separated from a conductive matrix due to the volume expansion.

According to example embodiments, the conductive single crystal silicon particle (300) on which the thin metal layer (210) and the carbon coating layer (310) containing the nanopores (320) are sequentially formed may have the excellent bulk conductivity and surface conductivity at the same time and thus, may be highly stable against crushing of an active material by the volume expansion.

Hereinafter, conductive single crystal silicon particles each on which a thin metal layer and a carbon coating layer are sequentially formed according to example embodiments will be further described.

A conductive single crystal silicon particle coated with highly conductive carbon containing nanopores and an ultrathin metal film, and a high capacity anode material for the secondary battery including the same may include the conductive single crystal silicon particles (100), the thin metal layer (210), and the carbon coating layer (310).

The conductive single crystal silicon particle (100) may include a conductive single crystal silicon particle on which at least one element selected from group-III or group-V elements is doped.

Also, the entire quantity of the conductive single crystal silicon particles (100) may be acquired from silicon kerf that is byproduct generated during a process of preparing a silicon substrate for solar cell, and may be formed by friction or abrasion between conductive single crystal silicon ingot and a diamond sawing blade for grinding or slicing the conductive single crystal silicon ingot. In the case of producing silicon ingot by recycling silicon kerf, all impurity is to be eliminated. However, in the case of employing silicon kerf as an anode material for the secondary battery, a thin metal layer formed by a friction and abrasion process with the diamond sawing blade serves to enhance the surface conductivity and thus, may be employed without being removed.

As for the impurity contained in the conductive single crystal silicon particle (100), at least one element selected from B, Al, Ga, and Tl in the case of group III or at least one element selected from N, P, As, Sb, and Bi in the case of group V may be doped within the range of $10^{13}$ to $10^{19}$ atom $cm^{-3}$.

The thin metal layer (210) may be coated on the surface of the conductive single crystal silicon particle (100).

The thin metal layer (210) may be coated on the surface of the conductive single crystal silicon particle (100) through a friction or abrasion process between silicon and a metal component constituting the diamond sawing blade.

Here, the thin metal layer (210) may include at least one of Mo, Ni, Al, Mg, Ti, W, Fe, Cr, and Cu, or may be at least one of MoSi, $Ni_2Si$, NiSi, $NiSi_2$, $AlSi_2$, $Mg_2Si$, $TiSi_2$, $WSi_2$, $FeSi_2$, $CrSi_2$, and CuSi that are alloyed with silicon.

A thickness of the thin metal layer (210) may be within the range of 0.01 nm to 5 nm.

The conductive single crystal silicon particles (100) coated with the thin metal layer (210) may have the size distribution of 10 nm to 2 μm, desirably, the size distribution of 50 nm to 500 nm.

The carbon coating layer (310), as a highly conductive carbon coating layer, may be formed on the thin metal layer (210). In this instance, the nanopore (320) may be formed between the conductive single crystal silicon particle (100) and the carbon coating layer (310). The nanopores (320) may be formed between a silicon particle coated with a metal layer and a carbon layer formed on the metal layer. The nanopores (320) may be continuous or discontinuous. Also, the nanopores (320) may be formed by removing silica ($SiO_2$) remaining as a thin film on the surface of the silicon particle and may be provided in a shape of continuous or discontinuous thin space between silicon and the carbon layer.

In this example, the carbon coating layer (310) may be formed to coat the silicon surface during a process of mixing or performing ball milling of at least one carbon-based material selected from ketjen black, denka black, acetylene black, super P, fullerene, single-wall carbon nanotube (SWNT), multi-wall carbon nanotube (MWNT), carbon nanofiber, graphene, graphene oxide, reduced graphene oxide, doped graphene, carbon nanoribbon, natural graphite, and artificial graphite with the conductive single crystal silicon particles 100, and thereby the silicon particles may have the electrical conductivity of $10^3$ S $cm^{-1}$ or more.

A thickness of the carbon coating layer (310) may be within the range of 0.1 nm through 200 nm.

The nanopores (320) formed between the conductive single crystal silicon particle (100) and the carbon coating layer (310) may be formed by removing silica ($SiO_2$) remaining on the surface of the silicon particles during an HF etching process after forming the carbon coating layer (310), and may have the volume range of 0.1 vol % to 50 vol % over the volume of the conductive single crystal silicon particle (100).

The carbon coating layer (310) may include a portion that evenly covers the surface of the conductive single crystal silicon particle (100) or a portion that unevenly covers at least a portion of the surface of the conductive single crystal silicon particle (100).

The conductive single crystal silicon particles (300) each on which the thin metal layer 210 and the carbon coating layer (310) are sequentially formed may have the average diameter within the range of 10.1 nm to 2200 nm.

As described above, according to example embodiments, the conductive single crystal silicon particle (100), the thin metal layer (210), and the carbon coating layer (310) may have weight ratios of 80 to 99.89 wt %, 0.01 to 1 wt %, and 0.1 to 20 wt %, and respectively. A sum of the weight ratios may be 100 wt %.

Further, an anode for the secondary battery may be prepared by mixing the conductive single crystal silicon particles (300) each on which the thin metal layer (210) and the carbon coating layer (310) are sequentially formed with a binder and a conductive agent and by forming the mixture on a current collector by slurry casting. Here, the conductive single crystal silicon particle (300) on which the thin metal layer (210) and the carbon coating layer (310) are sequentially formed, the conductive agent, and the binder used for preparing the anode may have weight ratios of 60 to 80 wt %, 5 to 15 wt %, and 5 to 15 wt %, respectively. A sum of the weight ratios may be 100 wt %.

Also, the anode for the secondary battery may be prepared by mixing the conductive single crystal silicon particles (300) each on which the thin metal layer (210) and the carbon coating layer (310) are sequentially formed with commercialized graphite, the anode material, the binder, and the conductive agent, and by forming the mixture on the current collector by slurry casting. In this case, the conductive single crystal silicon particles (300) each on which the thin metal layer (210) and the carbon coating layer (310) are sequentially formed may be mixed with the range of 2 to 50 wt % over graphite.

The anode for the secondary battery may be formed by further including the binder and the conductive agent in the anode material for the secondary battery according to example embodiments.

As described above, according to example embodiments, the anode for the secondary battery may be formed by mixing the conductive single crystal silicon particles (300) each on which the thin metal layer (210) and the carbon coating layer (310) are sequentially formed with the binder and the conductive agent, and by forming the mixture on the current collector by slurry casting. Also, the anode for the secondary battery may be formed by mixing the conductive single crystal silicon particles (300) each on which the thin metal layer (210) and the carbon coating layer (310) are sequentially formed with graphite, the binder, and the conductive agent, and by forming the mixture on the current collector by slurry casting.

FIG. 2 is a flowchart illustrating a method of preparing a silicon anode material coated with highly conductive carbon containing nanopores and a thin metal layer according to example embodiments.

FIG. 2 illustrates a detailed method of preparing conductive single crystal silicon anode material coated with metal-silicon alloy containing a metal silicide (silicon composite) phase of FIG. 1.

A method of preparing an anode material for the secondary battery according to example embodiments may include preparing conductive single crystal silicon ingot on which at least one element selected from group-III and group-V elements is doped; forming a thin metal layer on the surface of each of the conductive single crystal silicon particles grinded or crushed by cutting the conductive single crystal silicon ingot using a metal cutting tool or a diamond sawing blade including a matrix material and by mechanical friction between the metal cutting tool or the metal matrix and the conductive single crystal silicon ingot; grinding the conductive single crystal silicon particles coated with the thin metal layer to have the uniform particle size through primary ball milling; forming a carbon coating layer on the surface of each of the conductive single crystal silicon particles coated with the thin metal layer by performing secondary ball milling of the conductive single crystal silicon particles coated with the thin metal layer together with a carbon-based material; and forming nanopores between the silicon particle and the carbon coating layer by performing acid etching of the conductive single crystal silicon particles each on which the thin metal layer and the carbon coating layer are sequentially formed and thereby removing silicon oxides on the surface of the silicon particle.

Also, the method of preparing an anode material for the secondary battery may further include preparing the anode for the secondary battery by mixing the conductive single crystal silicon particles each on which the thin metal layer and the carbon coating layer are sequentially formed and containing the nanopores with a binder and a conductive agent and by forming the mixture on a current collector by slurry casting, after performing the acid etching. The conductive single crystal silicon particle each on which the thin metal layer and the carbon coating layer are sequentially formed, the conductive agent, and the binder used to prepare the anode may have weight ratios of 60 to 80 wt %, 5 to 15 wt %, and 5 to 20 wt %, respectively. A sum of the weight ratios may be 100 wt %. Also, the conductive single crystal silicon particles each on which the thin metal layer and the carbon coating layer are sequentially formed and containing the nanopores may be mixed with a currently commercialized graphite anode material and thereby be used to the anode. That is, the anode for the secondary battery may be formed by mixing the conductive single crystal silicon particles each on which the thin metal layer and the carbon coating layer are sequentially formed with graphite, the binder, and the conductive agent and by forming the mixture on the current collector by slurry casting. Here, the conductive single crystal silicon particles each on which the thin metal layer and the carbon coating layer are sequentially formed and containing the nanopores may be included at the content within the range of 2 to 50 wt % over graphite.

As described above, according to example embodiments, there may be provided conductive single crystal silicon particles having a high electrical conductivity and excellent durability and each on which a thin metal layer and a carbon coating layer are sequentially formed. Also, there may be provided silicon particles coated with highly conductive carbon containing nanopores by mixing and performing ball milling of conductive single crystal silicon particles each on which the thin metal layer is coated and impurity is doped with a carbon-based material and then by removing silica through acid treatment.

Hereinafter, each process according to example embodiments will be further described.

In the step S10, conductive single crystal silicon ingot on which at least one element selected from group-III and group-V elements is doped may be prepared.

Here, an impurity element selected from group-III or group-V elements may be at least one element selected from B, Al, Ga, and Tl in the case of group-III or may be at least one element selected from P, As, Sb, and Bi in the case of group-V.

A doping concentration of group-III or group-V elements may be selected within the range of $10^{13}$ to $10^{19}$ atom $cm^{-3}$, such that the electrical conductivity of silicon single crystal particles acquired through crushing becomes to be $10^2$ S/cm or more.

In the step S20, a thin metal layer may be formed on the surface of each of the conductive single crystal silicon particles acquired by grinding or cutting the conductive single crystal silicon ingot using a metal cutting tool or a diamond sawing blade using a metal material and by mechanical friction between the metal cutting tool or the metal matrix and the conductive single crystal silicon ingot.

For example, the thin metal layer may include at least one silicide phase selected from Mo, Ni, Al, Mg, Ti, W, Fe, Cr, and Cu, or from $MoSi$, $Ni_2Si$, $NiSi$, $NiSi_2$, $AlSi_2$, $Mg_2Si$, $TiSi_2$, $WSi_2$, $FeSi_2$, $CrSi_2$, and $CuSi$ that are alloyed with silicon. In addition, without being limited to a specific material, any metal silicide phase not reacting to lithium and also having a high electrical conductivity compared to silicon may be employed. The thin metal layer may be nickel silicide formed during a silicon crushing process using a nickel electroplating diamond sawing blade, which is widely used for a cutting process. In particular, nickel silicide constitutes three silicon compounds of $Ni_2Si$, $NiSi$, and $NiSi_2$ and thus, a silicide phase may be easily formed.

A thickness of the thin metal layer may be within the range of 0.01 nm to 5 nm, desirably, a thickness of 0.05 nm to 2 nm.

In the step S30, the conductive single crystal silicon particles coated with the thin metal layer may be grinded to have the uniform particle size through primary ball milling.

For example, the average particle size of conductive single crystal silicon particles coated with the thin metal layer may be included within the range of 10 nm to 2 μm. Desirably, conductive single crystal silicon particles coated with the thin metal layer, acquired through primary ball milling, may have the size range of 50 nm to 500 nm.

In the step S40, a carbon coating layer may be formed on the surface of each of the conductive single crystal silicon particles coated with the thin metal layer by performing secondary ball milling of the conductive single crystal silicon particles coated with the thin metal layer together with a carbon-based material.

Here, in the conductive single crystal silicon particles coated with the thin metal layer and the carbon coating layer (highly conductive carbon), [conductive single crystal silicon on which impurity selected from group-III or group-V elements is doped]X, [metal]Y, and [carbon]Z may have weight ratios of X=80 to 99.89 wt %, Y=0.01 to 1 wt %, and Z=0.1 to 20 wt %, respectively, and X+Y+Z=100 wt %.

In particular, the carbon-based material added when performing secondary ball milling may have a weight ratio of 0.1 to 20 wt % over the conductive single crystal silicon particle coated with the thin metal layer.

Also, [conductive single crystal silicon on which impurity selected from group-III or group-V elements is doped]X, [metal]Y, and [carbon]Z may have composition ratios of X=95 to 99.99 wt %, Y=0.01 to 1 wt %, and Z=0.1 to 10 wt %, respectively, and X+Y+Z=100 wt %.

For example, the carbon coating layer may be a carbon coating layer including at least one carbon-based material selected from ketjen black, denka black, acetylene black, super P, fullerene, single-wall carbon nanotube (SWNT), multi-wall carbon nanotube (MWNT), carbon nanofiber, graphene, graphene oxide, reduced graphene oxide, doped graphene, carbon nanoribbon, natural graphite, and artificial graphite, and acquired through secondary ball milling.

A thickness of the carbon coating layer that constitutes the silicon particle coated with highly conductive carbon containing nanopores and the thin metal layer may be within the range of 0.1 nm to 200 nm, desirably, a thickness of 0.5 nm to 150 nm.

In the step S50, nanopores may be formed between the silicon particle and the carbon coating layer by performing acid etching of the conductive single crystal silicon particles each on which the thin metal layer and the carbon coating layer are sequentially formed and thereby removing silicon oxides on the surface of the silicon particle.

That is, the nanopores may be formed between the silicon particle and the carbon coating layer by performing acid etching of the silicon particles coated with the highly conductive carbon and the thin metal layer, prepared in the step S40, and by removing silicon oxides on the surface of the silicon particle present in the inward side of the carbon coating layer.

For example, acid may use at least one selected from hydrogen fluoride, hydrogen bromide, hydrogen chloride, phosphoric acid, nitric acid, and sulfuric acid. Further, without being limited to a specific material, any acid which can remove only silicon oxides remaining on the surface of conductive single crystal silicon particle in the inward side of the highly conductive carbon and the thin metal layer can be used.

The nanopores formed between the conductive single crystal silicon particle and the carbon coating layer may be formed by removing silica ($SiO_2$) remaining on the surface of silicon particles during an HF etching process after performing carbon coating, and may have the volume range of 0.1 vol % to 50 vol % over the volume of the conductive single crystal silicon particle, desirably, the volume range of 0.2 vol % to 20 vol %.

The carbon coating layer containing nanopores may enhance a high rate capability of the secondary battery by increasing the surface electrical conductivity of the conductive single crystal silicon particles, and may form a solid electrolyte interface (SEI) layer on the surface of the anode material for the secondary battery and a buffer layer that may suppress the volume expansion occurring during charging and discharging silicon.

The silicon particles coated with highly conductive carbon containing nanopores and the thin metal layer may have the size distribution of 10.1 nm to 2200 nm, desirably, the size distribution of 20 nm to 500 nm.

The silicon particles coated with highly conductive carbon containing nanopores and the thin metal layer may have the high electrical conductivity of $10^3$ S/cm or more.

The method of preparing an anode material for the secondary battery may further include preparing the anode for the secondary battery by mixing the conductive single crystal silicon particles each on which the thin metal layer and the carbon coating layer are sequentially formed and containing nanopores with the binder and the conductive agent and by forming the mixture on the current collector by slurry casting, after performing the acid etching processing. The conductive single crystal silicon particle on which the thin metal layer and the carbon coating layer are sequentially formed and containing nanopores, the conductive agent, and the binder used to prepare the anode may have weight ratios of 60 to 80 wt %, 5 to 15 wt %, and 5 to 20 wt %, respectively. A sum of the weight ratios may be 100 wt %

The conductive single crystal silicon particles each on which the thin metal layer and the carbon coating layer are sequentially formed and containing nanopores may be mixed with a currently commercialized graphite anode material and thereby be used to the anode. Here, the conductive single crystal silicon particles each on which the thin metal layer and the carbon coating layer are sequentially formed and containing nanopores may be included at the content within the range of 2 to 50 wt % over graphite.

Additionally, according to example embodiments, there may be provided a method of preparing an anode for the secondary battery using the aforementioned method of preparing an anode material for the secondary battery.

That is, the anode for the secondary battery may be formed by performing acid etching of the conductive single crystal silicon particles each on which the thin metal layer and the carbon coating layer are sequentially formed and then by mixing the conductive single crystal silicon particles each on which the thin metal layer and the carbon coating layer are sequentially formed with a binder and a conductive agent, and by forming the mixture on the current collector by slurry casting. Also, the anode for the secondary battery may be formed by performing acid etching of the conductive single crystal silicon particles each on which the thin metal layer and the carbon coating layer are sequentially formed and then by mixing the conductive single crystal silicon particles each on which the thin metal layer and the carbon coating layer are sequentially formed with graphite, the binder, and the conductive agent, and by forming the mixture on the current collector by slurry casting.

Hereinafter, the present disclosure will be described through examples and comparisons. Examples and comparisons are simply provided to explain the present disclosure and the present disclosure is not limited thereto.

EXAMPLE 1

The Anode Material for the Secondary Battery Including Conductive Single Crystal Silicon Particles Coated with Highly Conductive Carbon Containing Nanopores and a Thin Metal Layer (Nickel Silicide), Through Mixing with 5 wt % Natural Graphite Over Silicon Hereinafter, a method of preparing an anode material for the secondary battery including conductive single crystal silicon particles coated with highly conductive carbon containing nanopores and a thin metal layer (nickel silicide) according to example embodiments will be described the step by the step.

The step of preparing conductive single crystal silicon ingot of a silicon substrate for solar cell by growing boron (B)-doped silicon single crystal will be described.

Initially, ingot may be prepared by growing the B-doped silicon single crystal. In more detail, the ingot may be prepared by growing silicon single crystal on which boron (B) among group-III elements is doped. The silicon single crystal has used the single crystal silicon ingot prepared using a known Czochralski method.

In this example 1, boron (B) was selected as group-III impurity. Without being limited to specific impurity, any impurity which can increase the electrical conductivity of bulk silicon and selected from group-III or group-V elements may be employed. Also, N-type highly conductive silicon ingot may be prepared by selecting phosphorus (P)

A step of forming the thin metal layer (nickel silicide) on the surface of each of the conductive single crystal silicon particles grinded by mechanical friction between a metal matrix and the conductive single crystal silicon ingot will be described.

The conductive single crystal silicon particles coated with the thin metal layer (nickel silicide) may be prepared by cutting or crushing the B-doped silicon single crystal ingot using a dicing diamond blade including a nickel matrix.

Herein, the conductive single crystal silicon particles coated with the thin metal layer (nickel silicide) was prepared by cutting or crushing the B-doped silicon single crystal ingot using the dicing diamond blade including the nickel matrix.

The step of grinding the conductive single crystal silicon particles coated with the thin metal layer (nickel silicide) to have the uniform particle size through primary ball milling will be described.

The conductive single crystal silicon particles having the size of 500 nm or less and coated with the thin metal layer (nickel silicide) were prepared by grinding the silicon composite particles coated with metal silicide to have the uniform particle size through primary ball milling.

The step of forming a carbon coating layer on the surface of each of the conductive single crystal silicon particles coated with the thin metal layer (nickel silicide) together with a carbon-based material (5 wt % natural graphite) through secondary ball milling will be described.

Here, [conductive single crystal silicon]X-[metal]Y-[carbon]Z composite silicon particles in which [conductive single crystal silicon on which impurity selected from group-III or group-V elements is doped]X, [metal]Y, and [carbon]Z have weight ratios of X=80 to 99.89 wt %, Y=0.01 to 1 wt %, and Z=0.1 to 20 wt %, respectively, and X+Y+Z=100 wt % may be prepared by performing secondary ball milling of the conductive single crystal silicon particles coated with the thin metal layer (nickel silicide) together with the carbon-based material.

Herein, the conductive single crystal silicon particles coated with highly conductive carbon and the thin metal layer (nickel silicide) were prepared by mixing the conductive single crystal silicon particles coated with the thin metal layer (nickel silicide) with 5 wt % natural graphite over the silicon particles and by performing secondary ball milling of the mixture. Dry-zirconia ball milling was used for the secondary ball milling. By applying the same weight ratio to zirconia balls having different radiuses (5 mm and 10 mm), a weight ratio between the zirconia balls and the mixture of the conductive single crystal silicon particles coated with the thin metal layer (nickel silicide) and natural graphite was 5:1. Ball milling was performed for 15 hours after injection of Ar gas into a ball milling vessel in order to suppress the silicon oxidation during a ball milling process.

The step of forming nanopores between the silicon particle and the carbon coating layer by removing the silicon oxides on the surface of the silicon particle present in the inward side of the carbon coating layer by performing acid etching of the silicon particles coated with carbon will be described.

Nanopores may be formed between the silicon particle and the carbon coating layer by removing the silicon oxides on the surface of the silicon particle present in the inward side of the carbon coating layer by performing acid etching processing of the silicon particles coated with carbon.

Herein, the surface silicon oxides was removed by etching of the conductive single crystal silicon particles coated with the highly conductive carbon and the thin metal layer (nickel silicide) with 5% hydrofluoric acid at 300 rpm for one hour.

The slurry for the anode was prepared by mixing 70 wt % of the silicon particles acquired according to example 1, 20 wt % poly acrylic acid-and-sodium carboxymethylcellulose mixture binder (50/50 w/w), and 10 wt % super P carbon particles. The slurry was casted on a Cu current collector, subsequently dried, and pressed. Finally, the uniform-sized anode was prepared by punching.

EXAMPLE 2

The Anode Material for the Secondary Battery Including Conductive Single Crystal Silicon Particles Coated with Highly Conductive Carbon and a Thin Metal Layer (Nickel Silicide) Through Mixing with 1 wt % Natural Graphite Over Silicon In example 2, the conductive single crystal silicon particles coated with the thin metal layer (nickel silicide) were prepared based on the same process conditions as example 1.

Herein, according to example 2, the conductive single crystal silicon particles coated with the highly conductive carbon and the thin metal layer (nickel silicide) were prepared by mixing the conductive single crystal silicon particles coated with the thin metal layer (nickel silicide) with 1 wt % natural graphite over the silicon particles and by performing secondary ball milling.

Nanopores were formed between the silicon particle and the carbon coating layer by removing silicon oxides on the surface of the silicon particle by performing acid etching of the silicon particles coated with carbon.

Herein, the surface silicon oxides was removed by etching of the conductive single crystal silicon particles coated with the highly conductive carbon and the thin metal layer (nickel silicide) with 5% hydrofluoric acid at 300 rpm for one hour.

The slurry for the anode was prepared by mixing 70 wt % of the silicon particles acquired according to example 2, 20 wt % poly acrylic acid-and-sodium carboxymethylcellulose mixture binder (50/50 w/w), and 10 wt % super P carbon particles. The slurry was casted on a Cu current collector, subsequently dried, and pressed. Finally, the uniform-sized anode was prepared by punching.

EXAMPLE 3

The Anode Material for the Secondary Battery Including Conductive Single Crystal Silicon Particles Coated with Highly Conductive Carbon Containing Nanopores and a Thin Metal Layer (Nickel Silicide) Through Mixing with 3 wt % Natural Graphite Over Silicon In example 3, the conductive single crystal silicon particles coated with the thin metal layer (nickel silicide) were prepared based on the same process conditions as example 1 and example 2.

Herein, according to example 3, the conductive single crystal silicon particles coated with the highly conductive carbon and the thin metal layer (nickel silicide) were prepared by mixing the conductive single crystal silicon particles coated with the thin metal layer (nickel silicide) with 3 wt % natural graphite over the silicon particles and by performing secondary ball milling.

Nanopores were formed between the silicon particle and the carbon coating layer by removing the silicon oxides on the surface of the silicon particle by performing acid etching of the silicon particles coated with carbon.

Herein, the surface silicon oxides was removed by etching of the conductive single crystal silicon particles coated with the highly conductive carbon and the thin metal layer (nickel silicide) with 5% hydrofluoric acid at 300 rpm for one hour.

The slurry for the anode was prepared by mixing 70 wt % of the silicon particles acquired according to example 3, 20 wt % poly acrylic acid-and-sodium carboxymethylcellulose mixture binder (50/50 w/w), and 10 wt % super P carbon particles. The slurry was casted on a Cu current collector, subsequently dried, and pressed. Finally, the uniform-sized anode was prepared by punching.

COMPARISON 1

The Anode Material for the Secondary Battery Including Silicon Nanoparticles Having the Average Diameter of 50 nm Comparison 1 relates to an anode material for the secondary battery including silicon nanoparticles having the average diameter of 50 nm and, for comparison to examples of the present disclosure, the silicon nanoparticles (Alfa Aesar) having the average diameter of 50 nm were prepared as the anode material for the secondary battery. The silicon nanoparticles used in comparison 1 are single crystal silicon particles each on which any element is not doped.

Even comparison 1 was based on the same conditions as example 1, example 2, and example 3. The slurry for the anode was prepared by mixing 70 wt % of the silicon particles acquired according to comparison 1, 20 wt % poly acrylic acid-and-sodium carboxymethylcellulose mixture binder (50/50 w/w), and 10 wt % super P carbon particles. The slurry was casted on a Cu current collector, subsequently dried, and pressed. Finally, the uniform-sized anode was prepared by punching.

COMPARISON 2

The Anode Material for the Secondary Battery Including Conductive Single Crystal Silicon Particles Coated with a Thin Metal Layer (Nickel Silicide)

In comparison 2, the conductive single crystal silicon particles coated with the thin metal layer (nickel silicide) were used for an anode material for the secondary battery. Based on the same conditions as example 1, example 2, and example 3, the conductive single crystal silicon particles coated with the thin metal layer (nickel silicide) were prepared by utilizing single crystal silicon particles grinded or cut from silicon kerf. The conductive single crystal silicon particles having the size of 500 nm or less and coated with the thin metal layer (nickel silicide) were prepared by grinding the silicon particles coated with metal silicide to have the uniform particle size through primary ball milling.

The slurry for the anode was prepared by mixing 70 wt % of the silicon particles acquired according to comparison 2, 20 wt % poly acrylic acid-and-sodium carboxymethylcellulose mixture binder (50/50 w/w), and 10 wt % super P carbon particles. The slurry was casted on a Cu current collector, subsequently dried, and pressed. Finally, the uniform-sized anode was prepared by punching.

Figure 3:
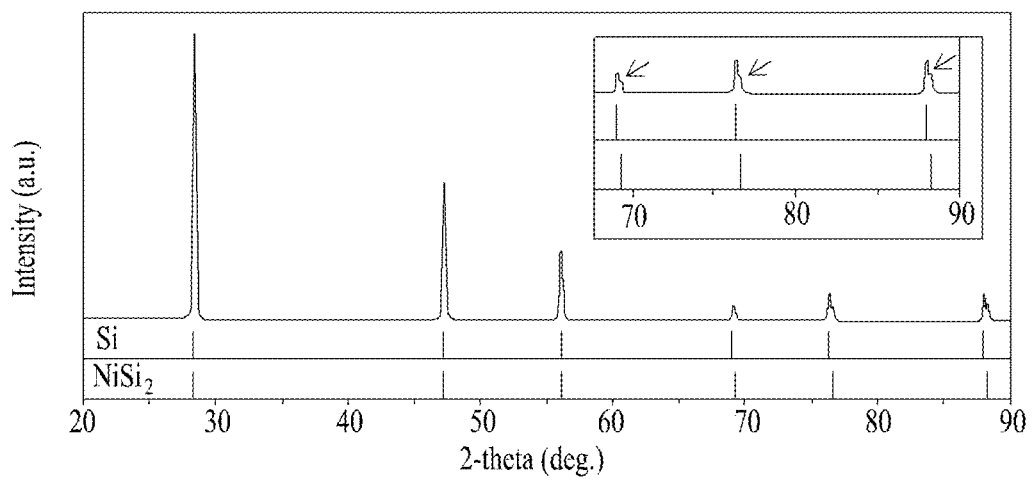
FIG. 3 is a graph showing X-ray diffraction patterns of the samples after performing acid treatment of conductive single crystal silicon particles coated with a thin metal layer according to example embodiments.

FIG. 3 is a graph showing diffraction patterns (RIGAKU, D/MAX-250) after performing acid treatment of conductive single crystal silicon particles coated with a thin metal layer according to example 1. Referring to FIG. 3, silicon crystals were well formed and each of the silicon particles was coated with nickel silicide during a friction and crushing process with a diamond sawing blade including a nickel matrix. Thus, traces of nickel silicide were observed at analyzing the X-ray diffraction. An inset image of FIG. 3 is a result showing that nickel silicide is present as a result of analyzing XRD acquired after performing HF treatment.

Figure 4A:
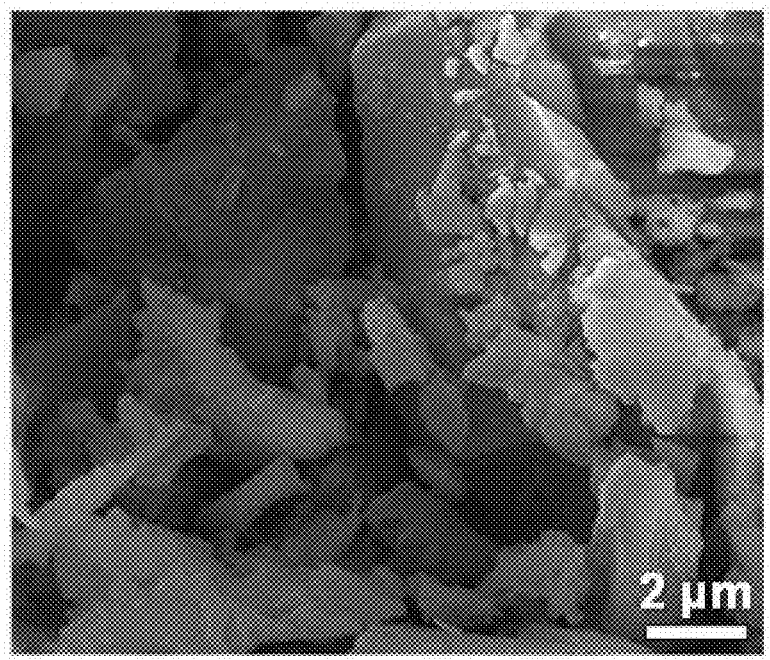
FIGS. 4A and 4B illustrate pictures of shapes after performing ball milling of conductive single crystal silicon particles coated with a thin metal layer according to example embodiments.
Figure 4B:
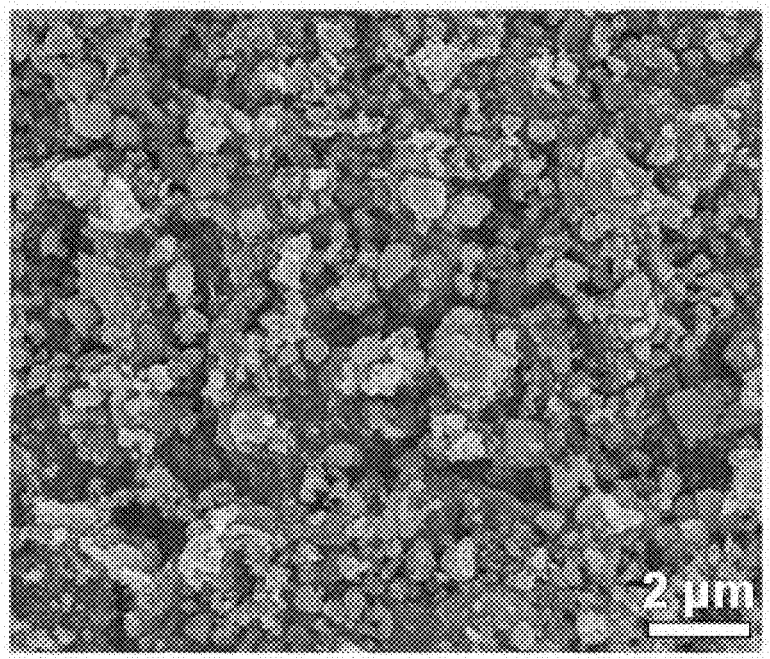

FIGS. 4A and 4B illustrate pictures of shapes after performing ball milling of conductive single crystal silicon particles coated with a thin metal layer according to example embodiments.

FIG. 4A shows a picture before (a) primary ball milling of the conductive single crystal silicon particles coated with the thin metal layer (nickel silicide) according to example 1 and FIG. 4B shows a picture of (b) a scanning electron microscope (FEI company Nova 230) after performing the primary ball milling.

Here, it can be verified that the conductive single crystal silicon particles each on coated with the thin metal layer (nickel silicide) showed the size distribution of tens of micrometers (μm) to tens of nanometers (nm) and showed the size distribution of 10 nm to 2 μm after ball milling for 20 hours.

Figure 5A:
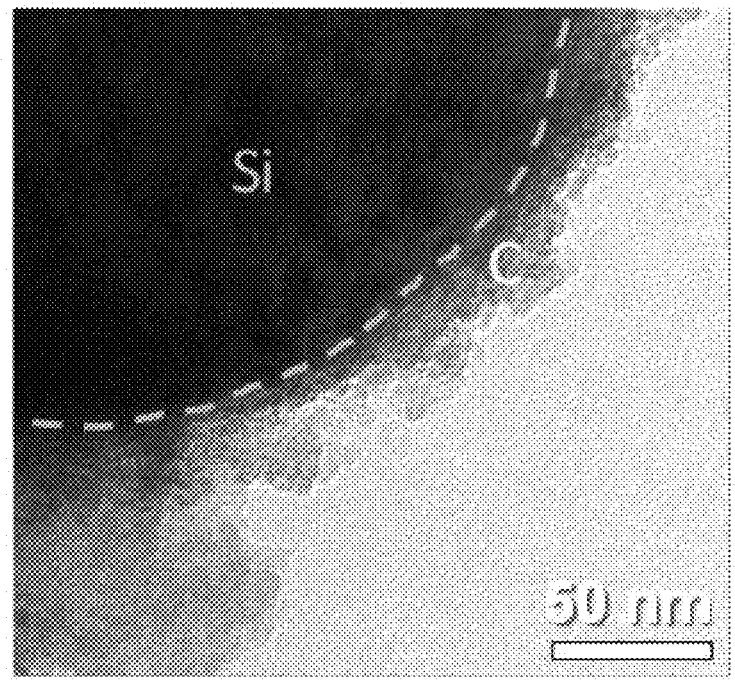
FIGS. 5A and 5B illustrate pictures of shapes before and a shape after performing acid treatment of conductive single crystal silicon particles coated with a thin metal layer and a carbon coating layer according to example embodiments.
Figure 5B:
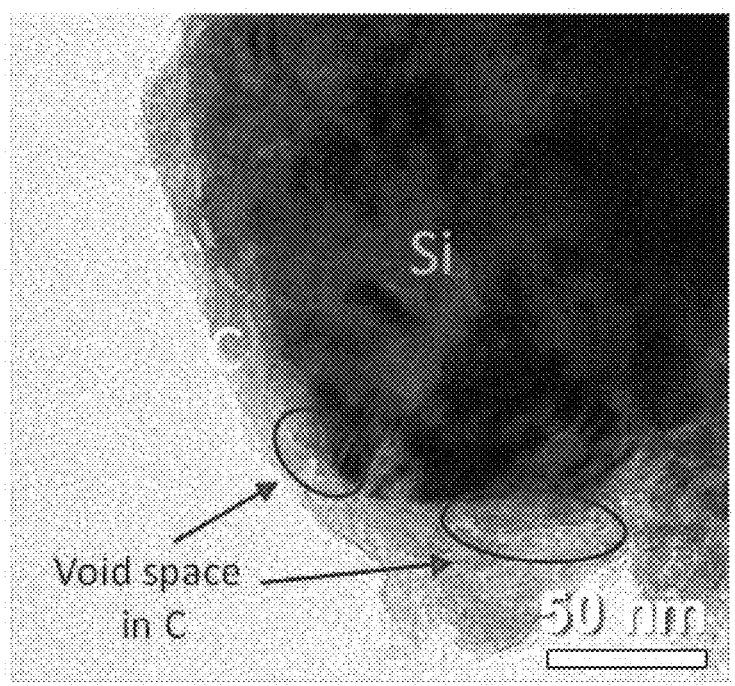

FIGS. 5A and 5B illustrate pictures of a shape before and a shape after performing acid treatment of conductive single crystal silicon particles coated with a thin metal layer and a carbon coating layer (highly conductive carbon) according to example embodiments.

FIG. 5A shows a picture before (a) performing HF treatment of the conductive single crystal silicon particles coated with highly conductive carbon and the thin metal layer (nickel silicide) according to example 1 and FIG. 5B shows a picture of (b) a scanning electron microscope (FEI company, Tecnai TF30 ST) after performing the HF treatment. It can be verified from the scanning electron microscope picture that thin nanopores have been developed between the conductive single crystal silicon surface coated with the thin metal layer (nickel silicide) and a carbon layer after performing the HF treatment compared to before performing the HF treatment. The volume of nanopores is less than about 1 vol % compared to volume of the silicon.

It can be verified that silicon particles coated with highly conductive carbon containing nanopores and the thin metal layer (nickel silicide) also had the similar size distribution of 10 nm to 2 μm.

Table 1 shows a composition analysis result using energy dispersive spectroscopy (EDS) about Si and O elements of silicon complex particles acquired before performing the HF treatment of the silicon particles coated with the highly conductive carbon and the thin metal layer (nickel silicide) according to example 1, and Table 2 shows a composition analysis result using EDS about Si and O elements of silicon complex particles acquired after performing the HF treatment of the silicon particles coated with the highly conductive carbon and the thin metal layer (nickel silicide) according to example 1.

TABLE 1

| Element | Weight ratio (wt %) | Element ratio (at %) |
|---|---|---|
| O | 7.53 | 11.1 |
| Si | 82.54 | 69.3 |
| C | 9.93 | 19.5 |

TABLE 2

| Element | Weight ratio (wt %) | Element ratio (at %) |
|---|---|---|
| O | 0.82 | 1.21 |
| Si | 90.33 | 76.15 |
| C | 8.85 | 22.64 |

According to Table 1 and Table 2, the content of oxygen (O) decreased from 7.53% to 0.82% based on the weight ratio in the silicon particles coated with the highly conductive carbon and the thin metal layer (nickel silicide), prepared according to example embodiments. It indicates that most silicon oxides ($SiO_2$) present on the surface was removed through HF treatment of the silicon particles coated with highly conductive carbon containing nanopores and the thin metal layer (nickel silicide). To reduce surface contact resistance between silicon particles, silicon oxides (native $SiO_2$) easily formed on the surface of silicon particles is to be removed through acid treatment. Further, the silicon particles coated with highly conductive carbon containing nanopores and the thin metal layer (nickel silicide) were finally prepared by forming nanopores on the highly conductive carbon coating layer through HF treatment.

Figure 6:
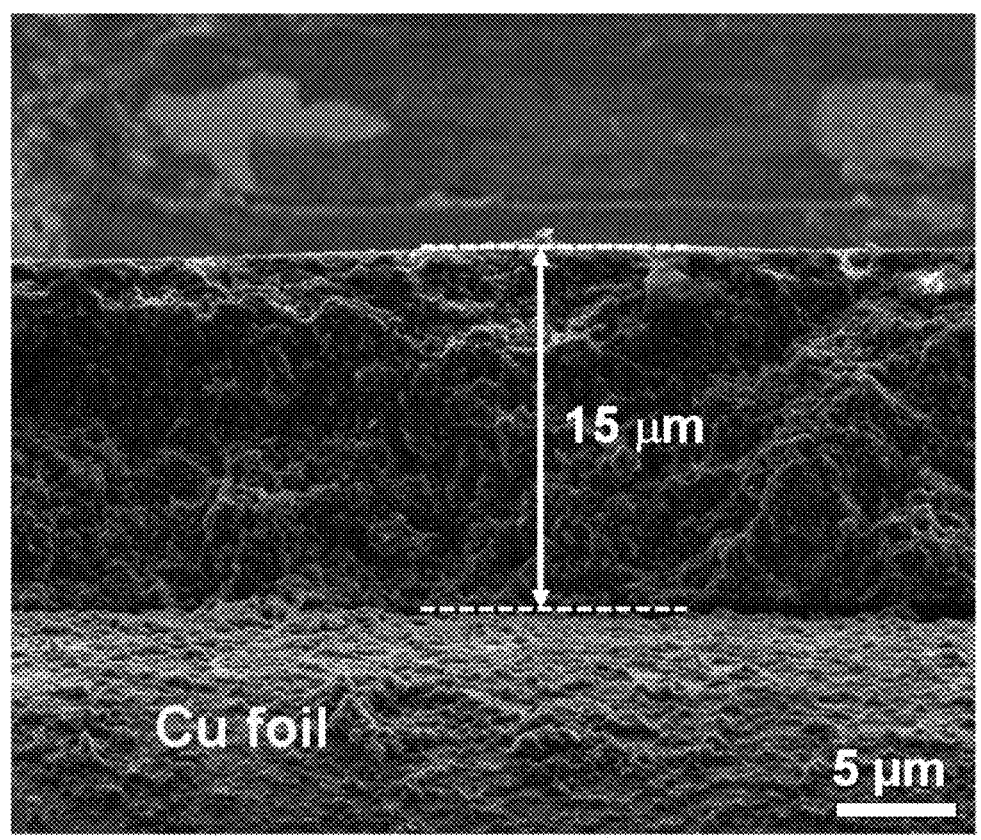
FIG. 6 illustrates an example of a composite formed by mixing conductive single crystal silicon particles coated with a thin metal layer and a carbon coating layer with a binder and a conductive agent according to example embodiments.

FIG. 6 illustrates an example of a composite formed by mixing conductive single crystal silicon particles coated with a thin metal layer and a carbon coating layer with a binder and a conductive agent according to example embodiments.

FIG. 6 shows a scanning electron stereoscopy (SEM) image of a cross-section of the silicon composite anode prepared by mixing the conductive single crystal silicon particles coated with the highly conductive carbon containing nanopores and the thin metal layer (nickel silicide) with the binder and the conductive agent and by forming the mixture on a current collector by slurry casting according to example 1. It can be known that the anode material is coated in a dense form with a thickness of about 15 μm.

1M $LiPF_6$ non-aqueous electrolyte may be prepared by adding $LiPF_6$ to a non-aqueous solution prepared by mixing ethylene carbonate and diethyl carbonate at a volume ratio of 30:70. Here, a lithium metal foil was used for a counter electrode. A coin-type the secondary battery was prepared by using a polyolefin separation film between two electrodes and by injecting electrolyte. Cell characteristics of the secondary batteries prepared according to examples and comparisons were measured based on a constant-temperature condition of 25° C. in a charge and discharge regulator (Wonatech, WBCS3000S).

Figure 7:
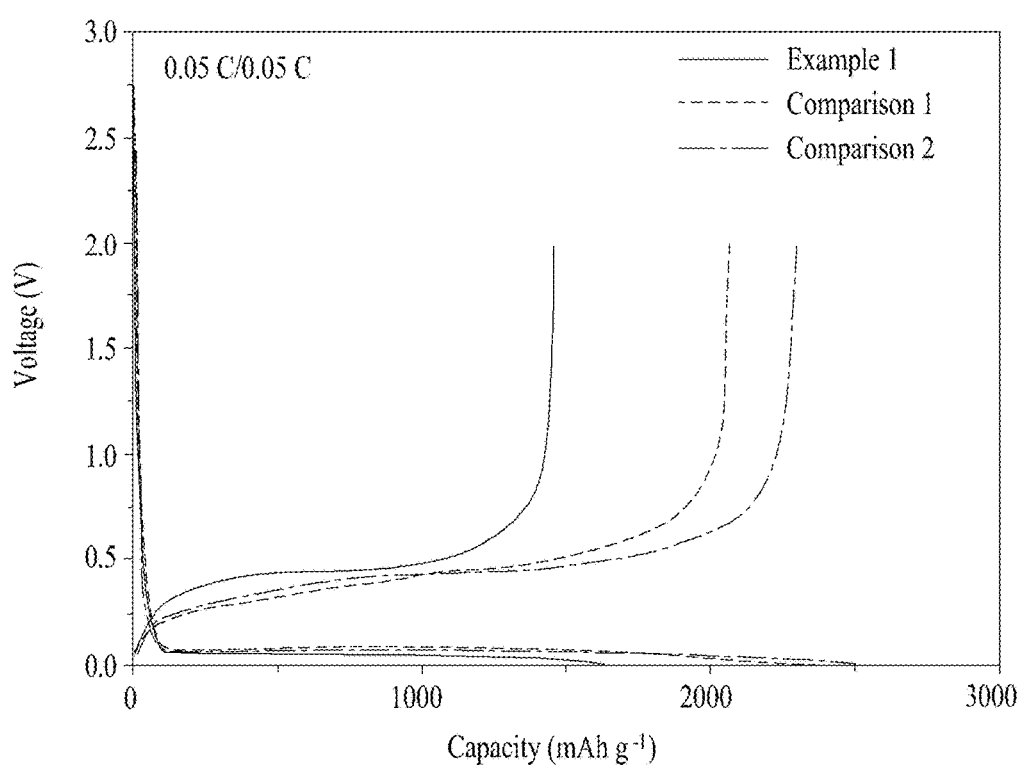
FIG. 7 is a graph showing initial cycle characteristics of secondary batteries prepared according to an example and comparisons.

FIG. 7 is a graph showing initial cycle characteristics of the secondary batteries prepared according to example 1, comparison 1, and comparison 2.

FIG. 7 shows an initial cycle characteristic of a lithium half cell employing the anode for the secondary battery prepared according to example 1, comparison 1, and comparison 2. All slurries for anodes were prepared by using the same portion of binder and a conductive agent, and casted on a current collector. After drying and pressing, the anodes were punch with the same size and assembled as lithium half cell. As a result of performing initial charging and discharging at 0.05 C, the charging capacity and the discharging capacity of example 1 were 1637.4 mAh $g^{-1}$ and 1455.6 mAh $g^{-1}$, respectively. The charging capacity and the discharging capacity of comparison 1 were 2286.8 mAh $g^{-1}$ and 2061.4 mAh $g^{-1}$, respectively. The charging capacity and the discharging capacity of comparison 2 were 2515.0 mAh $g^{-1}$ and 2297.4 mAh $g^{-1}$, respectively. Initial coulombic efficiencies of example 1, comparison 1, and comparison 2 were 89%, 90%, and 91.3%, which are similar to one another.

Figure 8:
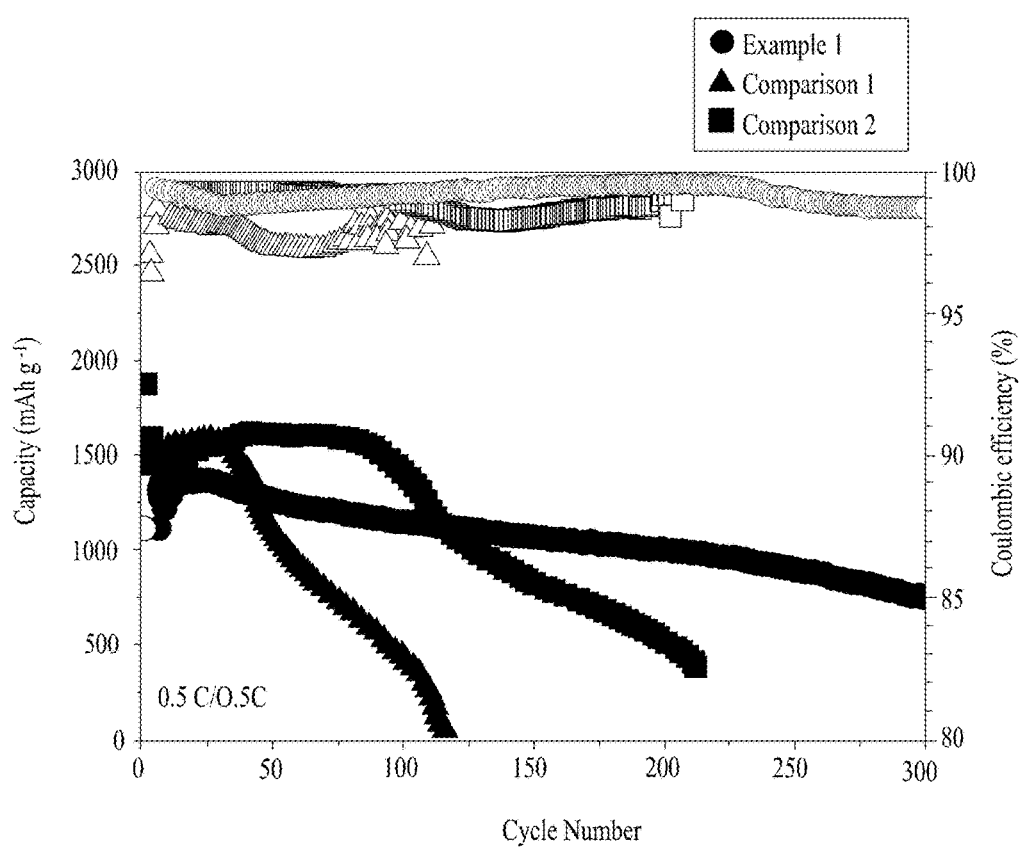
FIG. 8 is a graph showing cycling performances acquired by 300 cycles of secondary batteries prepared according to an examples and comparisons.

FIG. 8 is a graph showing cycling performances acquired by 300 cycles of the secondary batteries prepared according to example 1, comparison 1, and comparison 2.

The test was conducted at 0.5 C. From the test, example 1 showed a stable capacity retention even after 300 cycles. In the meantime, comparison 1 (were the anode in which not-doped silicon particles with the size of 50 nm were applied as the anode material) showed a rapid capacity fading after 40 cycles. Comparison 2 (where the anode in which B-doped single crystal silicon particles each not coated with the carbon layer and coated with the thin metal layer were applied as the anode material) showed a gradual degradation after 90 cycles. From this, it is possible to know that the conductive single crystal silicon particles coated with highly conductive carbon containing nanopores and the ultrathin metal film (nickel silicide), prepared according to example 1, have a high electrical conductivity due to the ultrathin metal film and the highly conductive carbon coating layer, and showed a significantly improved cycling performances due to the carbon coating layer containing nanopores which can mitigate the volume expansion.

Figure 9:
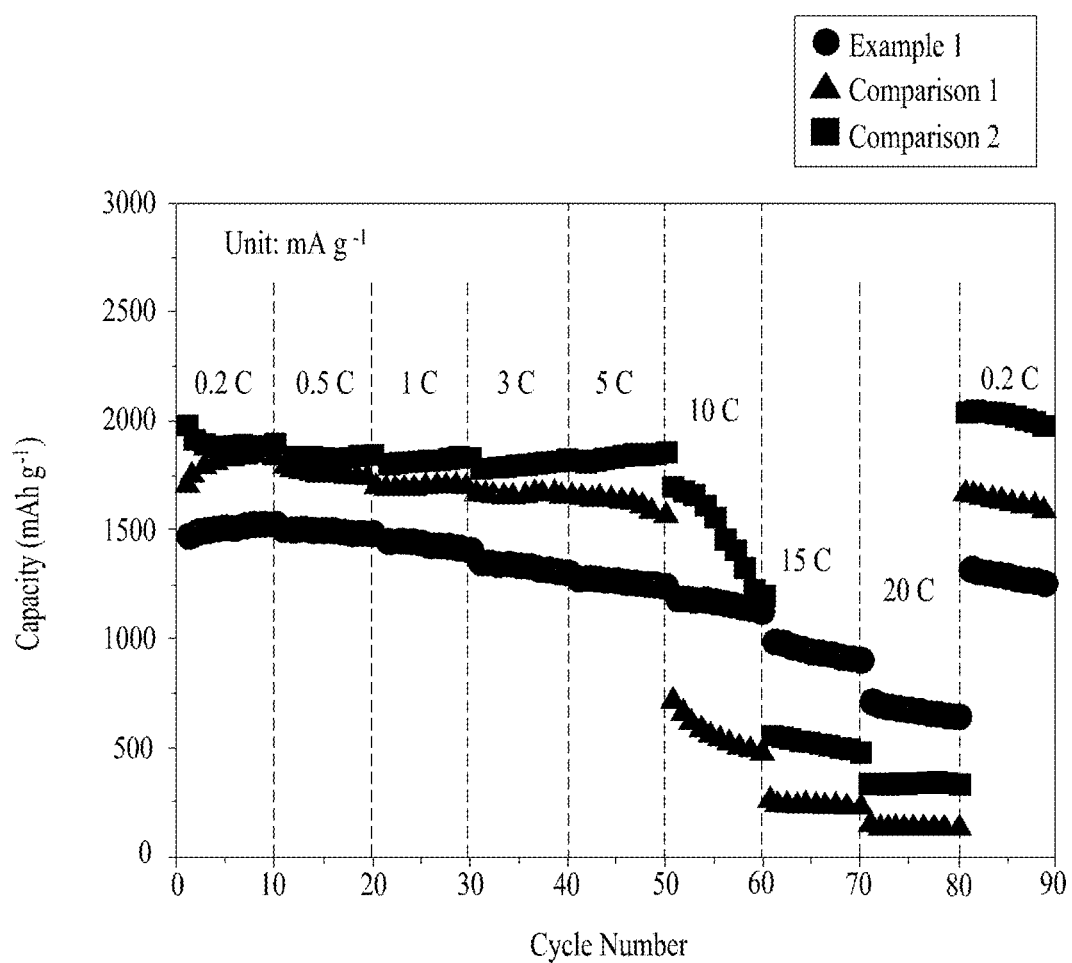
FIG. 9 is a graph showing rate capabilities of secondary batteries prepared according to an example and comparisons.

FIG. 9 is a graph showing rate capabilities of the secondary batteries prepared according to example 1, comparison 1, and comparison 2.

According to FIG. 9, it can be known that example 1 showed a rate capability compared to comparison 1 and comparison 2. Due to the conductive carbon coating layer that barely contributes to the capacity, the initial capacity of example 1 is lower than the initial capacity of comparison 1 and comparison 2.

Figure 10:
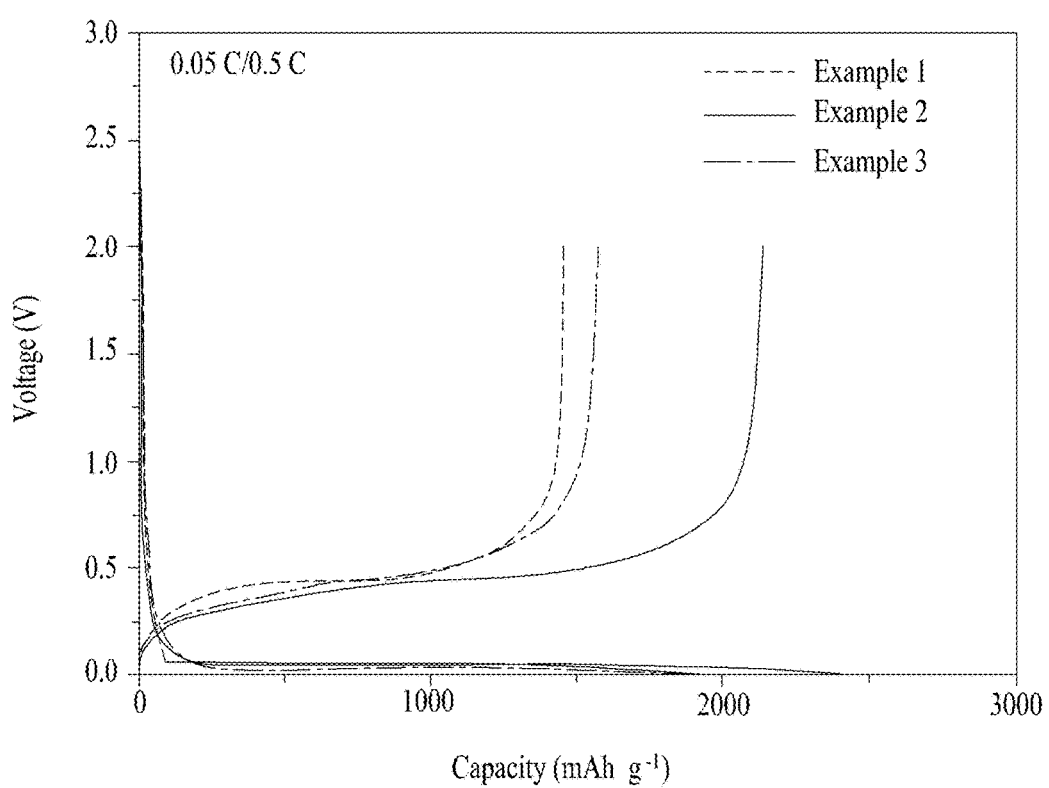
FIG. 10 is a graph showing initial cycle characteristics of secondary batteries prepared according to examples.

FIG. 10 is a graph showing initial cycle characteristics of the secondary batteries prepared according to example 1, example 2, and example 3.

Example 1, example 2, and example 3 were prepared with different ratio of natural graphite which was added when performing secondary ball milling. Initial cycle characteristics of lithium half cells using anodes for the secondary battery prepared by performing HF treatment of example 1, example 2, and example 3, by mixing the same with a binder and a conductive agent, and by forming the mixture on a current collector by slurry casting can be verified from the graph. As a result of performing initial charging and discharging at 0.05 C, the charging capacity and the discharging capacity of example 1 were 1637.4 mAh g$^{-1}$ and 1455.6 mAh g$^{-1}$, respectively. The charging capacity and the discharging capacity of example 2 were 2400.7 mAh g$^{-1}$ and 2134.7 mAh g$^{-1}$, respectively. The charging capacity and the discharging capacity of example 3 were 1875.4 mAh g$^{-1}$ and 1577.5 mAh g$^{-1}$, respectively. Initial coulombic efficiencies of example 1, example 2, and example 3 were 89%, 90%, and 84%, respectively. Herein, example 2 relating to conductive single crystal silicon particles coated with highly conductive carbon and the thin metal layer (nickel silicide) through secondary ball milling by mixing conductive single crystal silicon particle silicon particles coated with the thin metal layer (nickel silicide) with 1 wt % natural graphite showed the most excellent initial coulombic efficiency.

Figure 11:
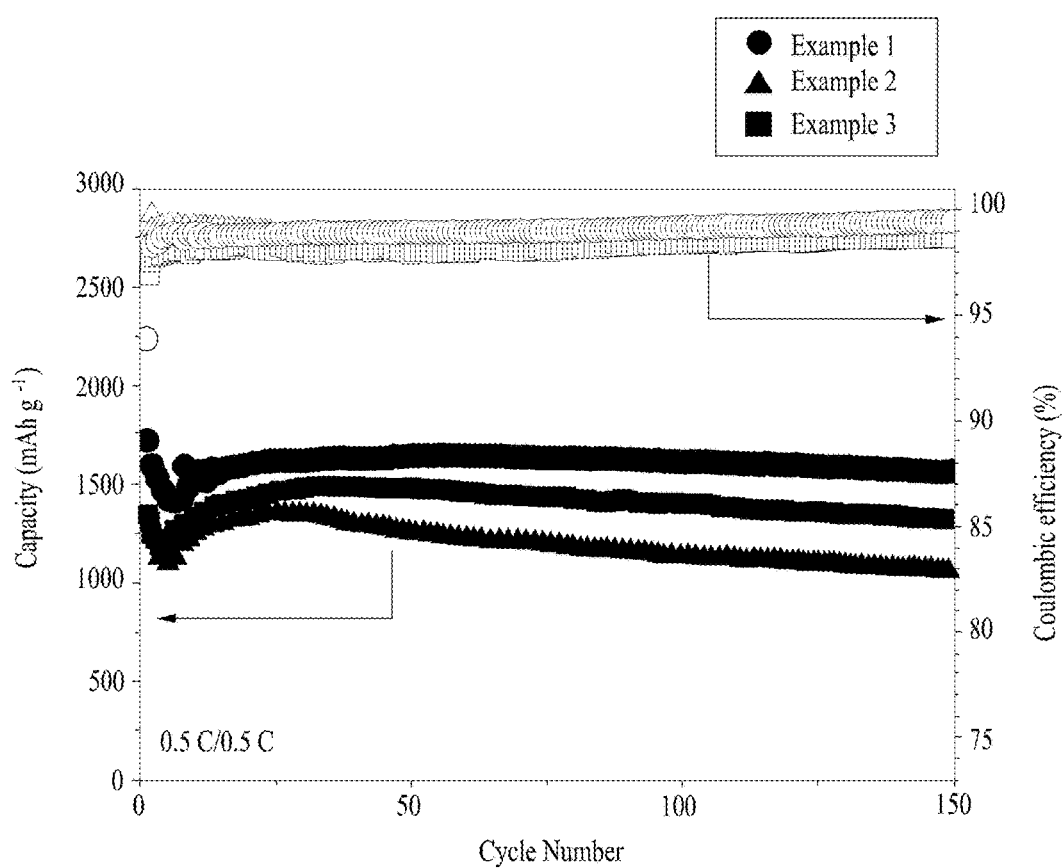
FIG. 11 is a graph showing cycling performances acquired by 150 cycles of secondary batteries prepared according to examples.

FIG. 11 is a graph showing cycling performances acquired by 150 cycles of the secondary batteries prepared according to example 1, example 2, and example 3.

With charging and discharging current being fixed at 0.5 C, the test was performed. A sample acquired from example 2 (where the anode in which conductive single crystal silicon particles coated with highly conductive carbon and nickel silicide (the thin metal layer) were applied as the anode material through secondary ball milling by mixing the same with 1 wt % natural graphite) showed a significantly stable capacity maintenance rate even after 150 cycles and also showed the highest available capacity compared to the anode materials acquired from other examples. Example 1 and example 3 also showed a stable capacity maintenance rate even after 150 cycles, while the significantly low content of natural graphite over silicon was relatively high compared to example 2 and thus, showed a relatively low capacity.

As described above, the present disclosure relates to conductive single crystal silicon particles coated with highly conductive carbon containing nanopores and an ultrathin metal film by recycling silicon kerf particles occurring during a process of grinding or cutting silicon ingot on which at least one element selected from group-III elements (B, Al, Ga, and Tl) or group-V elements (P, As, Sb, and Bi) to be manufactured as a wafer of a silicon substrate for solar cell, a high capacity anode material for the secondary battery including the same, and a preparing method thereof. In more detail, a diamond sawing blade used to cut the single crystal silicon ingot may generate conductive single crystal silicon waste particles coated with the thin metal layer with the size from tens of nanometers to tens of micrometers based on a grinding and crushing the step during a process of crushing (cutting) the silicon ingot.

A few hundred-nanometer-sized conductive single crystal silicon particles, which have uniform size distribution, coated with the thin metal layer were prepared from conductive single crystal silicon waste particles through primary ball milling. Next, conductive single crystal silicon composite particles coated with impurity on which conductive carbon is doped may be formed by adding a carbon-based material during secondary ball-milling process. Finally, conductive single crystal silicon particles coated with highly conductive carbon containing nanopores and the ultrathin metal film may be acquired by removing silicon oxides ($SiO_2$) remaining on the silicon surface by performing acid treatment of the conductive single crystal silicon particles coated with highly conductive carbon and the ultrathin metal film.

In the case of employing, as the anode material for the secondary battery, the conductive single crystal silicon particles coated with highly conductive carbon containing nanopores and the ultrathin metal film may have significantly enhance electrical conductivity. In addition, due to the nanopores present between the conductive carbon coating layer and the conductive single crystal silicon particle and a carbon matrix which can mitigate the volume expansion of the silicon anode. Accordingly, there may be provided a high capacity silicon carbon composite anode material on which at least one element selected from group-III elements (B, Al, Ga, and Tl) or group-IV elements (P, As, Sb, and Bi) are doped for the secondary battery having an excellent cycling performance and enhanced rate capability.

The highly conductive carbon layer was adopted on the surface of the silicon prepared through a simple series of process continuing mixing with natural graphite, ball milling, and acid treatment may remarkably enhance the conductivity of silicon particles. Further, the conductive carbon layer effectively suppress the excessive volume expansion during a charging process of silicon anode material, which leads to a significantly improved cycling performances and enhanced rate capability. In particular, conductive single crystal silicon particles coated with highly conductive carbon containing nanopores and the ultrathin metal film according to example embodiments may be acquired from silicon kerf particles that are produced in mass during a process of preparing conductive silicon ingot for solar cell. Furthermore, this method is economical and environmental friendly because as-synthesized conductive single crystal silicon particles are obtain from silicon kerf waste.

Although a few example embodiments have been shown and described, the present disclosure is not limited to the described example embodiments. Instead, it would be appreciated by those skilled in the art that changes may be made to these example embodiments without departing from the principles and spirit of the invention, the scope of which is defined by the claims and their equivalents.

What is claimed is:

1. An anode material for the secondary battery, the anode material comprising;
   conductive single crystal silicon particles each on which at least one element selected from group-III and group-V elements is doped;
   a thin metal layer formed to coat the surface of each of the conductive single crystal silicon particles; and
   a highly conductive carbon coating layer formed on the thin metal layer, wherein nanopores are formed between the conductive single crystal silicon particle and the carbon coating layer.

2. The anode material of claim 1, wherein the conductive single crystal silicon particle, the thin metal layer, and the carbon coating layer have weight ratios of 80 to 99.89 wt %, 0.01 to 1 wt %, and 0.1 to 20 wt %, respectively, and a sum of the weight ratios is 100 wt %.

3. The anode material of claim 1, wherein the conductive single crystal silicon particles are acquired from silicon kerf that is byproduct generated during a process of preparing a silicon substrate for solar cell and on which at least one element selected from group-III and group-V elements is doped, and is formed by friction or abrasion between conductive single crystal silicon ingot and a diamond sawing blade for grinding or slicing the conductive single crystal silicon ingot.

4. The anode material of claim 3, wherein the whole quantity of conductive single crystal silicon particles is acquired from silicon kerf that is byproduct generated during the process of preparing the silicon substrate for solar cell and on which at least one element selected from group-III and group-V elements is doped.

5. The anode material of claim 1, wherein impurity contained in the conductive single crystal silicon particles is at least one element selected from B, Al, Ga, and Tl in the case of group III, or at least one element selected from N, P, As, Sb, and Bi in the case of group V, and is doped within the range of $10^{13}$ to $10^{19}$ atom $cm^{-3}$.

6. The anode material of claim 1, wherein the thin metal layer is formed through a friction or abrasion process of a metal component and silicon that constitute a diamond sawing blade, and is formed to coat the surface of each of the conductive single crystal silicon particles.

7. The anode material of claim 1, wherein the thin metal layer uses at least one of Mo, Ni, Al, Mg, Ti, W, Fe, Cr, and Cu, or at least one of MoSi, $Ni_2Si$, NiSi, $NiSi_2$, $AlSi_2$, $Mg_2Si$, $TiSi_2$, $WSi_2$, $FeSi_2$, $CrSi_2$, and CuSi that are alloyed with silicon.

8. The anode material of claim 1, wherein a thickness of the thin metal layer is within the range of 0.01 nm to 5 nm.

9. The anode material of claim 1, wherein the conductive single crystal silicon particles coated with the thin metal layer have a size distribution of 10 nm to 2µm.

10. The anode material of claim 1, wherein the carbon coating layer is formed to coat the surface of each of the conductive single crystal silicon particles during a process of mixing or performing ball milling of at least one carbon-based material selected from ketjen black, denka black, acetylene black, super P, fullerene, single-wall carbon nanotube (SWNT), multi-wall carbon nanotube (MWNT), carbon nanofiber, graphene, graphene oxide(graphene oxide), reduced graphene oxide, doped graphene, carbon nanoribbon, natural graphite, and artificial graphite with the conductive single crystal silicon particles, and thereby the silicon particles have an electrical conductivity of $10^3$ S $cm^{-1}$ or more.

11. The anode material of claim 1, wherein a thickness of the carbon coating layer is within the range of 0.1 nm to 200 nm.

12. The anode material of claim 1, wherein the nanopores formed between the conductive single crystal silicon particle and the carbon coating layer are formed by removing silica ($SiO_2$) remaining on the surface of silicon particles during an HF etching process after forming the carbon coating layer, and the nanopores have a volume range of 0.1vol % to 50 vol % over the volume of the conductive single crystal silicon particle.

13. The anode material of claim 1, wherein the carbon coating layer includes a portion that evenly covers the surface of the conductive single crystal silicon particle or a portion that unevenly covers at least a portion of the surface of the conductive single crystal silicon particle.

14. The anode material of claim 1, wherein the conductive single crystal silicon particles each on which the thin metal layer and the carbon coating layer are sequentially formed have the average diameter selected from the range of 10.1 nm to 2200nm.

15. The anode material of claim 1, wherein an anode for the secondary battery is formed by mixing the conductive single crystal silicon particles each on which the thin metal layer and the carbon coating layer are sequentially formed with a binder and a conductive agent and by forming the mixture on a current collector by slurry casting.

16. The anode material of claim 1, wherein an anode for the secondary battery is formed by mixing the conductive single crystal silicon particles each on which the thin metal layer and the carbon coating layer are sequentially formed with graphite, a binder, and a conductive agent, and by forming the mixture on a current collector by slurry casting.

17. An anode for the secondary battery formed by further including a binder and a conductive agent in the anode material of claim 1.

18. The anode of claim 17, wherein the conductive single crystal silicon particles each on which the thin metal layer and the carbon coating layer are sequentially formed are mixed with the binder and the conductive agent, and the mixture is formed on a current collector by slurry casting.

19. The anode of claim 17, wherein the conductive single crystal silicon particles each on which the thin metal layer and the carbon coating layer are sequentially formed are mixed with graphite, the binder, and the conductive agent, and the mixture is formed on a current collector by slurry casting.

20. A method of preparing an anode material for the secondary battery, the method comprising:
preparing conductive single crystal silicon ingot on which at least one element selected from group-III and group-V elements is doped;
forming a thin metal layer on the surface of each of conductive single crystal silicon particles through mechanical friction or abrasion between conductive single crystal silicon ingot and a metal cutting tool or a metal matrix by cutting the conductive single crystal silicon ingot using the metal cutting tool or a diamond sawing blade including a metal matrix material;
forming a carbon coating layer on the surface of each of the conductive single crystal silicon particles coated with the thin metal layer by ball milling the conductive single crystal silicon particles coated with the thin metal layer with a carbon-based material; and
forming nanopores between the conductive single crystal silicon particle and the carbon coating layer by removing silicon oxides on the surface of the conductive single crystal silicon particle through acid etching of the conductive single crystal silicon particles each on which the thin metal layer and the carbon coating layer are sequentially formed.

21. The method of claim 20, further comprising:
performing primary ball milling of the conductive single crystal silicon particles coated with the thin metal layer to have a uniform particle size through ball milling, prior to forming the carbon coating layer on the surface of each of the conductive single crystal silicon particles coated with the thin metal layer, wherein the carbon coating layer is formed on the surface of each of the conductive single crystal silicon particles coated with the thin metal layer by performing secondary ball milling of the conductive single crystal silicon particles coated with the thin metal layer together with the carbon-based material.

22. The method of claim 20, wherein, in the forming of the carbon coating layer on the surface of each of the conductive single crystal silicon particles coated with the thin metal layer, the conductive single crystal silicon particle, the thin metal layer, and the carbon coating layer have weight ratios of 80 to 99.89 wt %, 0.01 to 1 wt %, and 0.1 to 20 wt %, respectively, and a sum of the weight ratios is 100 wt %, and the carbon-based material added in the performing of the secondary ball milling has a weight ratio of 0.1 to 20wt % over the conductive single crystal silicon particle coated with the thin metal layer.

23. The method of claim 20, wherein the carbon coating layer containing the nanopores forms a stable solid electrolyte interface (SEI) layer on the surface of the anode material and a buffer layer that increases a high rate capability of the secondary battery and suppresses a volume expansion occurring during charging and discharging of silicon by increasing a surface electrical conductivity of the conductive single crystal silicon particles.

24. A method of preparing an anode for the secondary battery, the method comprising:

preparing conductive single crystal silicon ingot on which at least one element selected from group-III and group-V elements is doped;

forming a thin metal layer on the surface of each of conductive single crystal silicon particles through mechanical friction or abrasion between conductive single crystal silicon ingot and a metal cutting tool or a metal matrix by cutting the conductive single crystal silicon ingot using the metal cutting tool or a diamond sawing blade including a metal matrix material;

forming a carbon coating layer on the surface of each of the conductive single crystal silicon particles coated with the thin metal layer by ball milling the conductive single crystal silicon particles coated with the thin metal layer with a carbon-based material;

forming nanopores between the conductive single crystal silicon particle and the carbon coating layer by removing silicon oxides on the surface of the conductive single crystal silicon particle through acid etching of the conductive single crystal silicon particles each on which the thin metal layer and the carbon coating layer are sequentially formed; and forming the anode for the secondary battery by performing acid etching of the conductive single crystal silicon particles each on which the thin metal layer and the carbon coating layer are sequentially formed and then mixing the conductive single crystal silicon particles each on which the thin metal layer and the carbon coating layer are sequentially formed with a binder and a conductive agent and forming the mixture on a current collector by slurry casting or mixing the conductive single crystal silicon particles each on which the thin metal layer and the carbon coating layer are sequentially formed with graphite, the binder, and the conductive agent and forming the mixture on the current collector by slurry casting.

* * * * *